United States Patent [19]

Hanson et al.

[11] 4,036,257
[45] July 19, 1977

[54] LIQUID CARGO LOADING APPARATUS

[75] Inventors: Carl V. Hanson, Renton; Philip C. Whitener, Seattle, both of Wash.

[73] Assignee: The Boeing Company, Seattle, Wash.

[21] Appl. No.: 562,264

[22] Filed: Mar. 26, 1975

[51] Int. Cl.² .............................................. F16L 29/00
[52] U.S. Cl. ............................... 137/614.06; 137/615; 251/89.5; 251/149.9
[58] Field of Search ........................... 137/614.06, 615; 251/89.5, 149.9, 169, 280

[56] References Cited

U.S. PATENT DOCUMENTS

| | | | |
|---|---|---|---|
| 3,216,744 | 11/1965 | Elbogen et al. | 251/89.5 X |
| 3,295,553 | 1/1967 | Garrett et al. | 137/614.06 |
| 3,510,101 | 5/1970 | Burtis | 251/280 X |
| 3,590,862 | 7/1971 | De Graaf | 137/614.06 X |
| 3,721,424 | 3/1973 | Vanderlinden | 251/280 X |

FOREIGN PATENT DOCUMENTS 1,282,405    11/1968    Germany ............................. 251/280

*Primary Examiner*—Alan Cohan
*Assistant Examiner*—Gerald A. Michalsky
*Attorney, Agent, or Firm*—Christensen, O'Connor, Garrison & Havelka

[57] ABSTRACT

An apparatus is provided for rapid loading and unloading of large volumes of liquid to and from a cargo transport, herein a landed aircraft transport. At a ground station, liquid is loaded from, or unloaded to, a reservoir equipped with a positionable, extendible hollow tubular boom having a cross-sectional flow area exceeding thirty square feet. At the extendible end of the boom, a valve closure is provided, movable by a power-driven ball-screw actuator between a retracted position closing the open end of the boom and an extended, open position spaced forwardly of the boom end. A cooperating valve assembly and receptacle for receiving the positionable boom end are mounted on the aircraft in a wing section, accessible by a fold-away hinged wingtip. A movable, normally closed valve closure of the aircraft valve assembly is opened by an axially movable central plunger mechanism, engagable and axially displaceable by articulated fingers on a forward face of the boom valve closure, such that the plunger is depressed inwardly of the aircraft valve assembly as the boom is moved into place. Thereupon, the boom valve closure is opened by the power screw actuator. Internally of the aircraft valve assembly, an overcenter valve-locking toggle mechanism is responsive to the displacement of the plunger, so as to unlock the aircraft valve and allow it to be driven rearwardly to an open position in unison with the opening of the boom valve closure. A peripheral, inflatable seal is provided on the rim of the seated boom end for selective sealing of the mated boom and receptacle during liquid loading and unloading. After transfer of the liquid load, the boom valve closure is retracted by the screw actuator, the aircraft valve is closed and locked by the internal toggle mechanism, the peripheral seal is deflated, and the boom is retracted. To permit loading and unloading of low-temperature liquified gas, the toggle-locking assembly for the aircraft valve is constructed to compensate for thermal expansion and contraction of the structural members to insure a stable, positive, sealed closure of the aircraft valve during flight. Extension and alignment of the sizable boom into engagement with the aircraft receptacle is achieved by controlled servomechanisms for angulating and telescoping a pair of movable, interconnected boom sections, with fine alignment and positioning of the boom being automatically effected by a position probe sensor system which develops position error signals for operating the boom servomechanisms.

25 Claims, 16 Drawing Figures

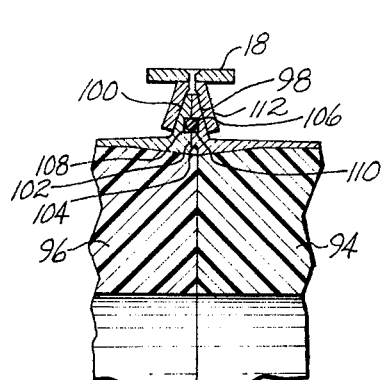
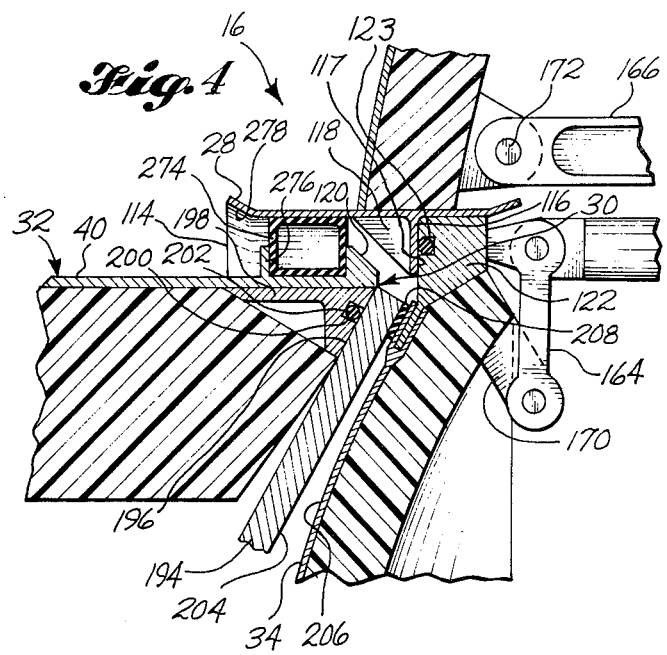
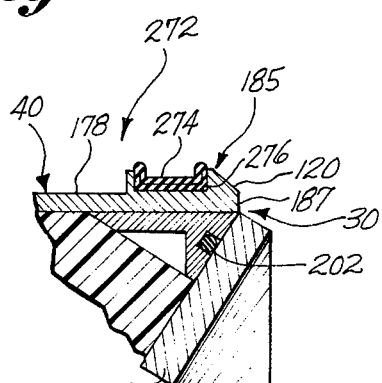
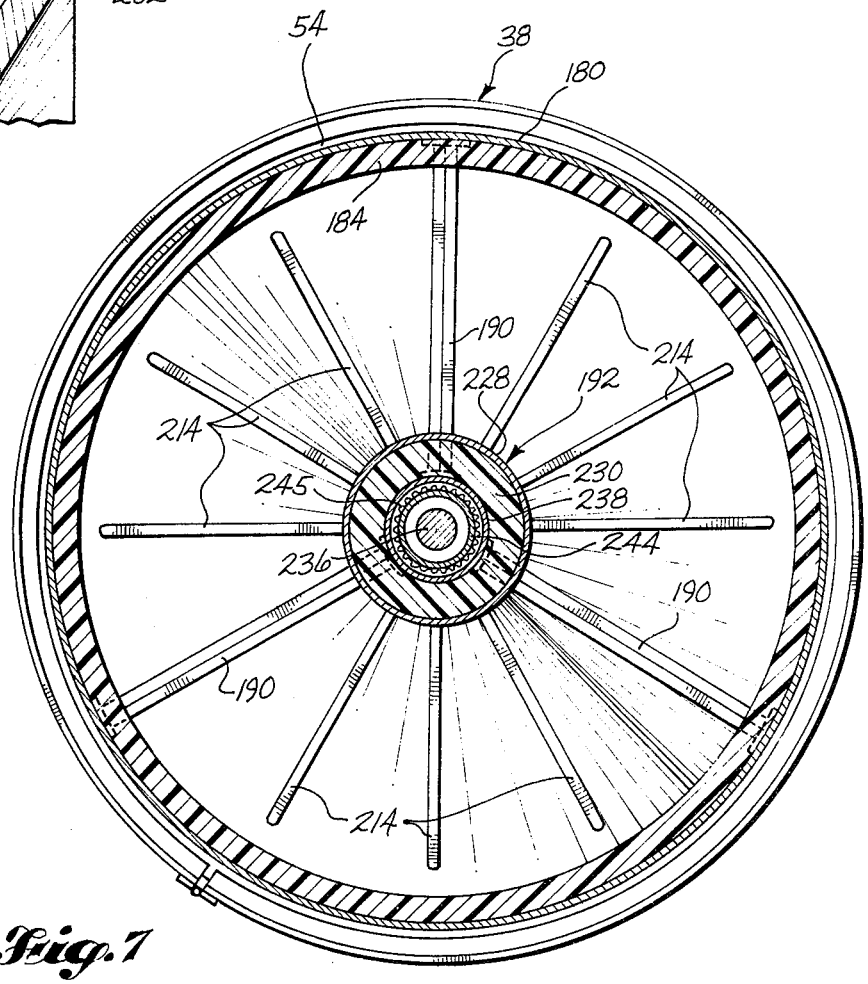

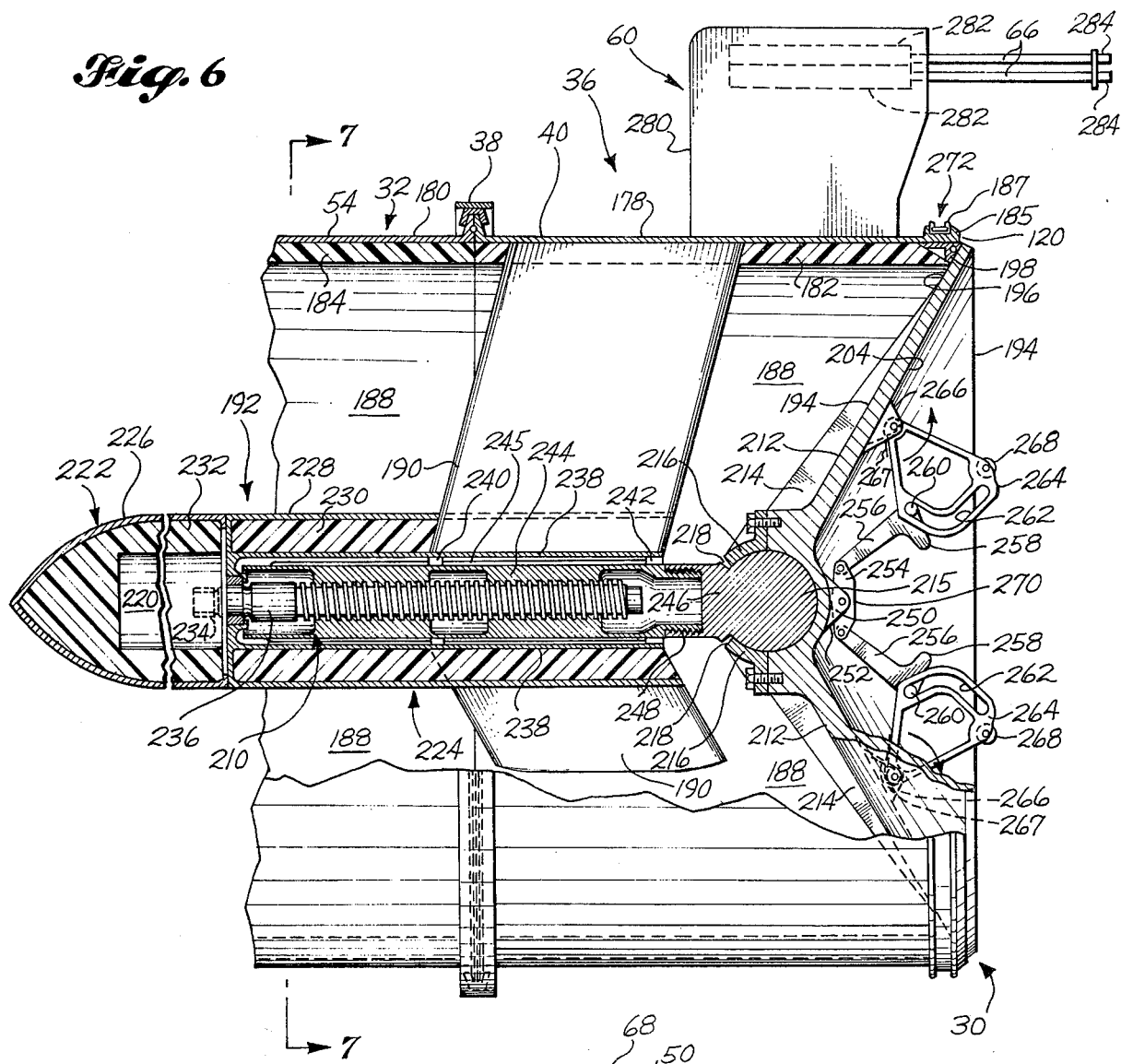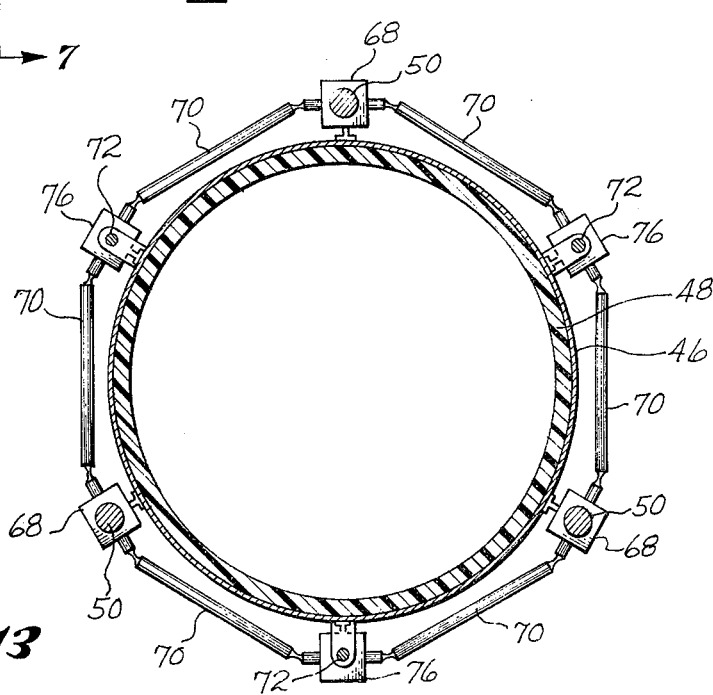

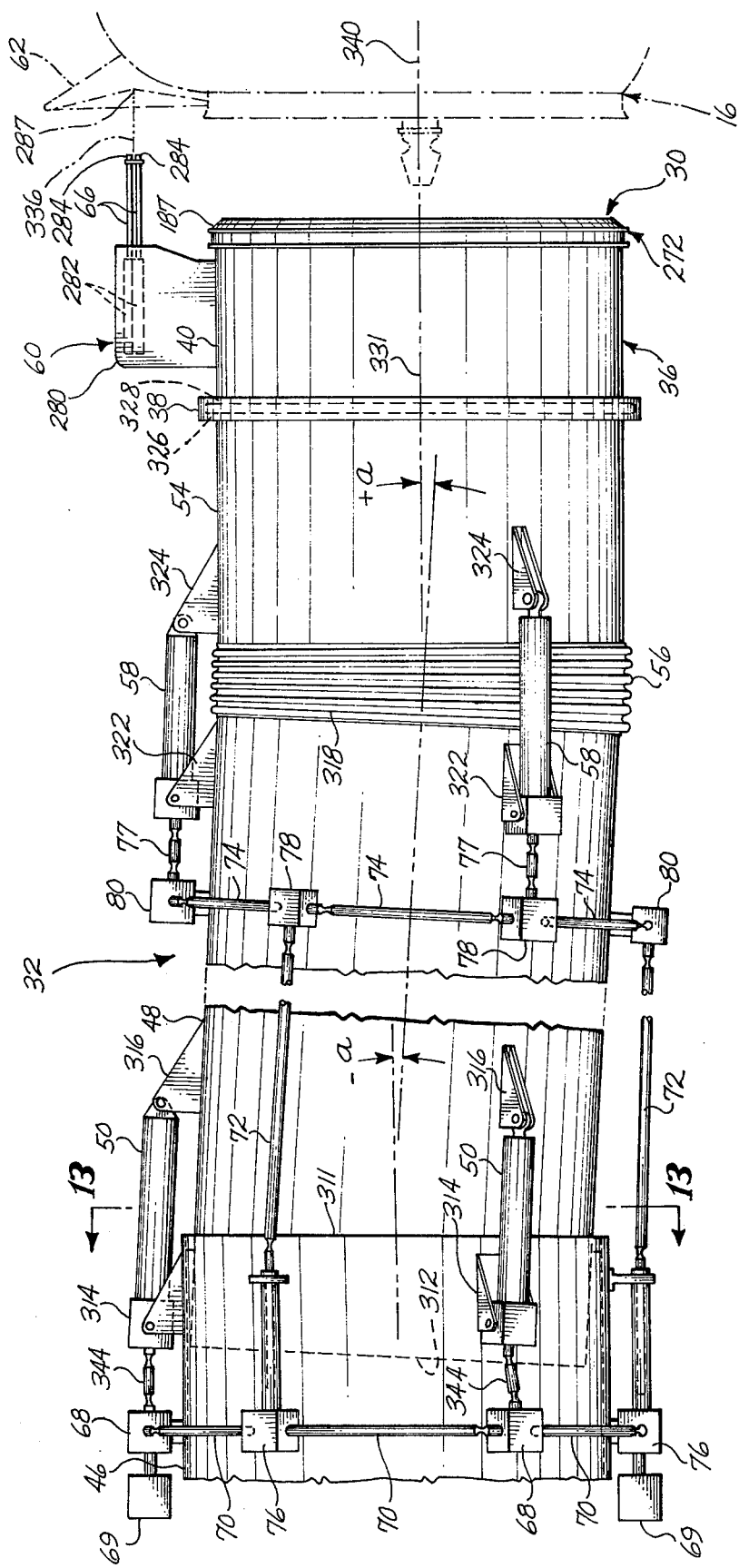

LIQUID CARGO LOADING APPARATUS

BACKGROUND OF THE INVENTION

The present invention relates to a system for loading and unloading large volumes of liquid to and from a transport vehicle, such as an aircraft or ship transport.

A need has arisen for new and improved modes of transporting liquid fossil fuels from remote geographical regions where the fuels are found, to populated industrial areas of the world. The discovery and development of the northslope oil fields on the Alaskan and Canadian Arctic Rim, and other remote locations, has presented monumental problems in connection with the transportation of crude oil and natural gas to local refineries and storage facilities.

The northslope fields are situated in the furthest reaches of what could be regarded as one of the last land frontiers. There are no existing natural ports as such, and man-made ports are icebound for many months of the year. These ports are accessible only through the most determined icebreaking efforts, which for supertankers loaded with crude oil and holding the thread of massive pollution if the ships' hulls were damaged, is almost impossible to consider.

The weather is some of the most forbidding in the world, multiplying the difficult problems of on-loading crude oil and natural gas. Although an overland oil and gas pipeline may be one solution, a viable alternative thereto is needed.

As a result of the above obstacles, the use of gigantic aircraft transports with enormous liquid cargo carrying capacity, in the range of 2 million pounds, are envisioned. These aircraft could, for example, transport liquid natural gas from remote, isolated regions to local industrial areas for storage and subsequent use; a practice heretofore untried. However, in order to operate economically and transport sufficient volumes of liquid cargo, aircraft of the type and size described must be airborne almost around the clock, e.g., for 20 hours a day. This dictates that the liquid cargoes of these aircraft must be loaded on and off at heretofore unheard of transfer rates to keep the on-the-ground time at a very minimum.

However, existing valve and fluid coupling devices used to transfer massive volumes of liquid to and from storage tanks, sea-going freighters, pipelines, etc., are entirely inadequate to accommodate the required flow rates and are unadaptable to aircraft structural requirements.

For example, a coupling capable of accommodating the envisioned flow rates would have a cross-sectional flow area in the neighborhood of 30 square feet, allowing a flow of approximately 19,000 cubic feet per minute, a rate which will permit transfer of 2 million pounds (approximately 560,000 gallons) of liquid natural gas, in approximately 4 minutes.

Additionally, the large volume, high rate transfer of cryogenic liquid natural gasses will inherently involve extreme temperature cycling of the components of the transfer apparatus. No known fluid coupling devices are capable of satisfactorily operating under these extreme temperature conditions and yet, at the same time, accommodating the large flow rates of liquid.

Furthermore, while the special requirements of aircraft transports provide an important example of the need for new liquid cargo loading and unloading devices, other transportation and storage modes can benefit from improved loading and unloading systems. The transfer of large volume liquid cargoes to and from sea-going freighters or ship transports, such as liquid natural gas tankers, will be significantly improved by providing equipment for increasing the flow rate of the liquid cargo during loading and unloading. Indeed, the transfer of liquid to or from any transport vehicle or carrier, whether a land, sea, air or space transport may be enhanced by providing apparatus for increasing the rate of liquid flow during the transfer operation.

SUMMARY OF THE PREFERRED EMBODIMENT OF THE INVENTION AND ITS OBJECTIVES

It is, therefore, an object of this invention to provide a liquid cargo transfer system and apparatus for fluids which affords an extremely rapid, large-volume fluid flow rate for use in loading and unloading liquid cargo to and from a transport vehicle or carrier.

Another object of the invention is to provide such a transfer system and apparatus for loading and unloading liquids at cryogenic temperatures, such as liquid natural gas, e.g., methane.

A further object of the invention is to provide a system and apparatus for rapid loading and unloading large volumes of low temperature liquids to and from an aircraft transport.

Briefly, these objects and others are achieved in the preferred embodiment of the invention, as more fully described herein, by a coupling system for transfer of liquid natural gas, which includes two separate but cooperating valve assemblies one of which is carried in a receptacle, mounted in the wingtip of the aircraft structure, while the other valve assembly is carried by, and serves as, an end valve closure for a groundbased loading-unloading boom. Both of the valve assemblies and their opening and closing mechanisms are constructed for reliable operation at temperatures as low as $-270°$ to $-290°$ F, the temperature of the proposed liquid methane cargo.

The aircraft valve assembly and receptacle are of light-weight construction and may be structurally integrated into the wing tanks of the aircraft. Access to the aircraft receptacle is by means of a hinged, foldable wingtip, which, when folded out of the way, exposes a wingtip cross section in which the loading receptacle and associated valve element are mounted.

After loading or unloading, and during flight, the aircraft valve must be positively, securely held in a closed position. For this purpose, a positive toggle-locking assembly is incorporated into the valve structure for firmly locking the aircraft valve in place. To minimize wingtip weight, a mechanism for opening, closing, and locking this valve and toggle assembly is carried by the ground-based boom mechanism. Additionally, the loading boom is provided with motive power, sensors, and servomechanisms for positioning the boom to align the boom and aircraft valve elements and for effecting their subsequent mating and activation.

Once the aircraft has been brought to a stop adjacent the ground-based loading station, the boom is longitudinally extended and axially aligned, while simultaneously and automatically maintaining parallelism between the faces of the valve elements. After being aligned and seated with respect to the aircraft receptacle, the boom valve element is driven outwardly and forwardly of the boom. This movement automatically engages and displaces an axially movable plunger component carried by the aircraft valve assembly which, in turn, mechanically unlocks the toggle assembly thereof and allows the aircraft valve element to be forced rearwardly in unison with the forward opening of the boom valve element. An inflatable seal is provided about the perimeter of the seated boom and receptacle to form a sealed coupling for completing the flow channel between the ground storage tanks and the aircraft tanks.

While the embodiment of the invention disclosure herein is thus concerned with the transfer of liquids to and from an aircraft transport, it will be appreciated that the apparatus may be used to advantage in loading and unloading large volumes of liquid such as liquid natural gas, crude oil, etc. to and from other types of transports such as sea tankers.

These and other features, objects, and advantages of the liquid cargo loading apparatus according to the present invention will become apparent to those skilled in the art from a consideration of the following detailed description and appended drawings of an exemplary embodiment thereof.

BRIEF DESCRIPTION OF DRAWINGS

FIG. 3 is a detailed cross-sectional view of the interface between the aircraft receptacle and valve element housing and the aircraft wingtank as it is secured by a quickdisconnect ring clamp.

FIG. 4 is a cross-sectional view of the valve elements at the instant of first mating in the area of the alignment channel and showing the inflatable seal inflated.

FIG. 6 is a partially sectioned side elevation view of the boom valve assembly of the system illustrated in FIG. 1b.

FIG. 7 is a cross-sectional view of the boom valve assembly taken along the section lines 7—7 shown in FIG. 6.

FIG. 8 is a cross-sectional detail view of the inflatable seal mounted on the perimeter of the boom adjacent a forward edge of the valve housing.

FIG. 9b is a detail view of the boom probe and aircraft target cone as seen from arrows 9b—9b of FIG. 9a.

FIG. 12 is a side elevation view of the loading boom shown in FIG. 1.

FIG. 13 is a cross-sectional view of the loading boom illustrating typical disposition of positioning and drive components associated with the articulable segmented boom as indicated by the section lines in FIG. 12.

And finally.

Figure 1A:
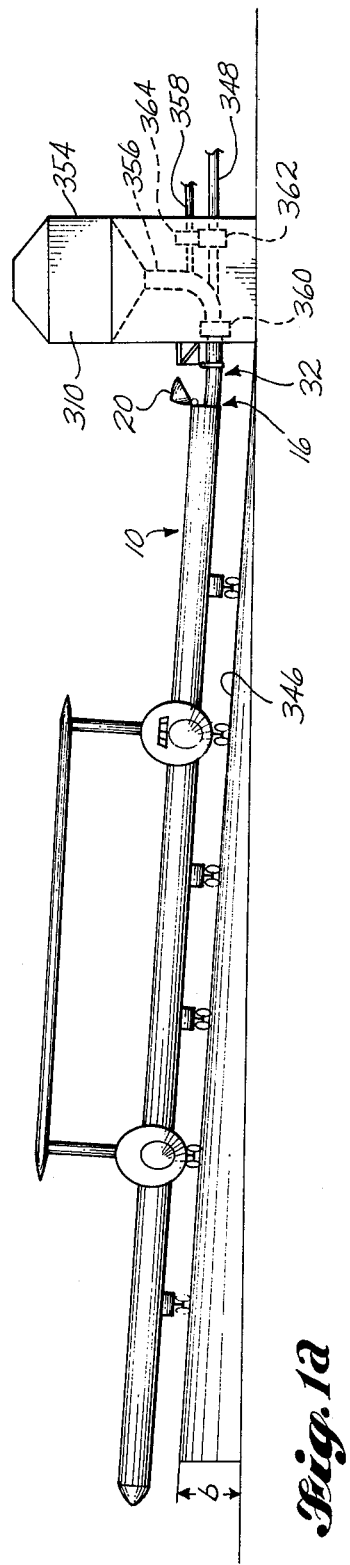
FIG. 1a is a front elevation view of an aircraft and liquid cargo station illistrating an inclination of the landed aircraft for gravity loading and unloading with respect to the ground storage tanks.
Figure 1B:
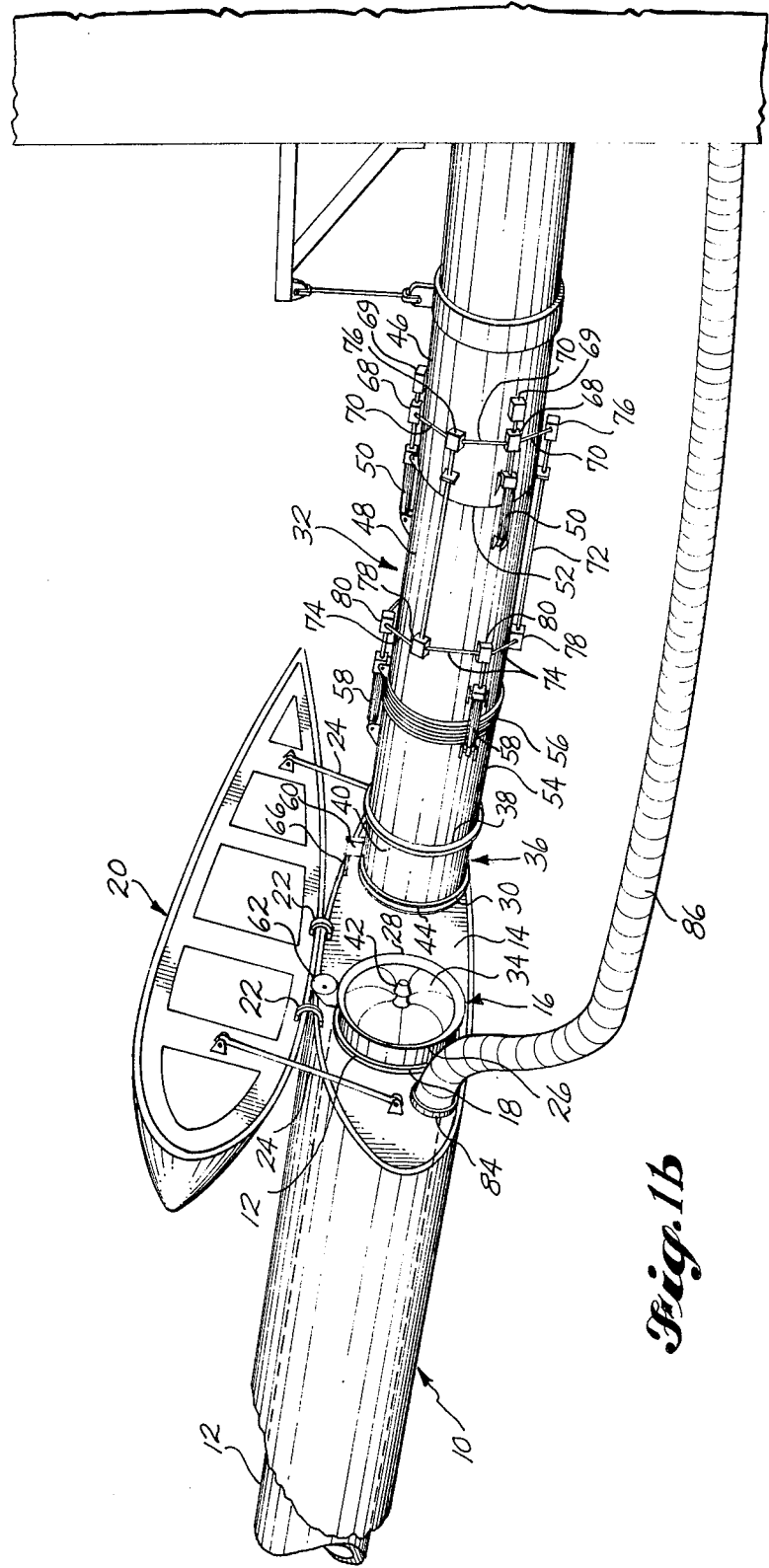
FIG. 1b is a perspective view of the aircraft and ground station of FIG. 1a showing the wingtip valve element and receptacle and the ground-based loading boom as it is moved into position with respect to the wingtip.

DESCRIPTION OF PREFERRED EMBODIMENT:

FIG. 1a illustrates the docking of the aircraft at the loading/unloading ground station while FIG. 1b shows the principal elements of the fluid coupling apparatus in accordance with the preferred form of the present invention. The wing structure 10 of the cargo aircraft may house a number of interconnected tubular cargo tanks which run parallel to one another for the length of the wing and form the structural wing spars as disclosed in a copening U.S. application entitled AIR CARGO LINER, Ser. No. 535,413, filed Dec. 23, 1974, by Philip C. Whitener, co-inventor of the present application.

In the embodiment shown in FIG. 1b, the central tubular wingtank forms the main wing spar and also functions as the main liquid cargo manifold. This wingtank 12 protrudes through an opening in a vapor-tight bulkhead formed by the outermost rib 14 of the main wing structure 10 and is terminated in a flange upon which the aircraft receptacle and valve assembly 16 is mounted by a quick disconnect clamp 18. The valve assembly 16 is accessible via the hinged wingtip section 20 which, through its power hinges 22 and associated guide struts 24, is elevated to a position as shown in FIG. 1b.

A housing 26 for the valve assembly 16 includes adjacent a forward end face, an annular alignment receptacle 28 flared on its outer end to receive the end 30 of the loading boom 32. Receptacle 28 is provided here as an integral part of a rearwardly facing valve seat against which a semi-toroidal shaped disc closure 34 seats from within housing 26. Disc closure 34 is normally locked in its seated, closed condition by internal toggle linkage means (not shown in the figure) which also functions as described herein to unlock and permit displacement of the closure disc to its open position. It should also be noted that disc closure 34 seats from the inside of valve housing 26 such that the pressure of fluid contained in the wingtank 12 tends to hold the valve disc sealed, tightly closed.

A hollow cylindrical section of loading boom 32 is terminated on its outer end in a flange upon which a boom valve assembly 36 is mounted by a quick disconnect ring clamp 38 in a manner similar to that previously described for the aircraft valve assembly. A housing 40 for boom valve assembly 36 is shaped and dimensioned in a manner that permits it to be coaxially inserted into the annular receptacle 28 carried by the wingtip such that the outer end face 30 of the boom substantially seats on a single continuous compression type seal disposed in the receptacle.

As boom 32 is moved toward this physical mating with the aircraft receptacle, actuator means on the face of the boom valve closure engage and depress an axially movable plunger means, here indicated at 42, protruding from the front or forward toroidal face of aircraft disc closure 34. This motion unlocks the aircraft valve formed by toroidal disc closure 34 by operating the internal toggle linkages. Unlocking of the aircraft valve is fully accomplished by the time boom 32 seats in receptacle 28.

At the instant of boom seating, one or more microswitches on housing 40 are closed to stop further boom extension and to actuate an inflatable seal 44 on housing 40. This causes seal 44 to inflate and form a positive primary seal between the coupled assemblies 36 and 16.

The loading boom 32 is preferably segmented and supported on a base section 46 which is coarsely positionable by a ground-based operator acting on servo control means to move the boom into the proximity of its final seated position. Thereafter, automatic, fine alignment and positioning means on the boom and wingtip take over to complete the operation.

Base section 46, which may be anchored to a loading tank, mounts an intermediate boom section 48 on three equally spaced, circumferentially disposed extendible ball-screw actuators 50 via a flexible, sealed joint 52. The actuators 50 function to displace the intermediate boom section 48 at an angle axially with respect to the base section 46. Intermediate boom section 48, in turn, mounts an end boom section 54 to which housing 40 is secured.

End boom section 54 is supported via flexible accordion joint 56 on three equally spaced extensible ball-screw actuators 58 aligned with actuators 50. Thus, boom 32 is extensible and axially articulable through two flexible, sealed joints which, as more fully described herein, afford axial alignment and yet a parallel positioning between the opposing faces of the two valve assemblies 16 and 36.

Final fine positioning of the boom is achieved atomatically through the interaction of a sensor assembly 60 on the boom valve housing 40 and a concave target 62 on the aircraft valve housing 26. Sensor assembly 60 and target 62 cooperatively engage as the boom is extended toward receptacle 28 through the operation of extension actuators 50 and/or 58.

The symetrically arranged tips of a set of three spaced apart, spring loaded sensor probes 66 intersect the conically concave target surface to provide positional differentiation between the probe axis, representing the boom position, and the target axis, representing the aircraft valve location. Resultantly, the transducers in the sensor assembly 60 generate continual differential boom positioning error signals as the boom end 30 converges on the face of the aircraft valve assembly 16 and as sensor probes 66 are compressed against the surface of target 62. These differential signals are applied to three equally spaced circumferentially disposed servomotors 69 on the boom exterior which drive the intermediate boom section ball-screw actuators 50 through miter boxes 68. Additionally, the servomotors 69, through circumferential and longitudinal torque tubes 70, 72 and 74, differentials 76 and 80, and miter gear boxes 68 and 78 and 80 reposition the end boom section 54 by driving the ball-screw actuators 58 to maintain parallelism at the boom to aircraft valve interface in a manner more fully described herein.

The internal liquid natural gas cargo manifold within the aircraft wing is vented to provide for overflow of both liquid and gaseous methane during transfer operations. Here, the vent 84 is located on the wing rib bulkhead 14 adjacent the aircraft valve assembly 16 and is connected to the loading tank by a flexible conduit 86 as shown in the figure. Alternatively the vent conduit may be mounted by an extendible boom, similar to boom 32. The tank vent line, connected during transfer operations, prevents the escape and waste of large quantities of methane and reduces chance of explosion in the loading area. Additionally, the closed loop venting of the aircraft tank system prevents contamination by ambient air, moisture and particle contaiminants.

It should also be understood that, though the preferred embodiment of this invention pictured in FIG. 1 describes a single loading channel system, two or more booms and aircraft valve combinations may be employed to substantially increase the loading and unloading flow rate, thereby proportionately reducing transfer time and, consequently, aircraft down time.

The preferred embodiment of the aircraft valve assembly is operable under extremely low temperature conditions to premit usw with cryogenic liquid cargos, particularly liquid natural gas.

Figure 2:
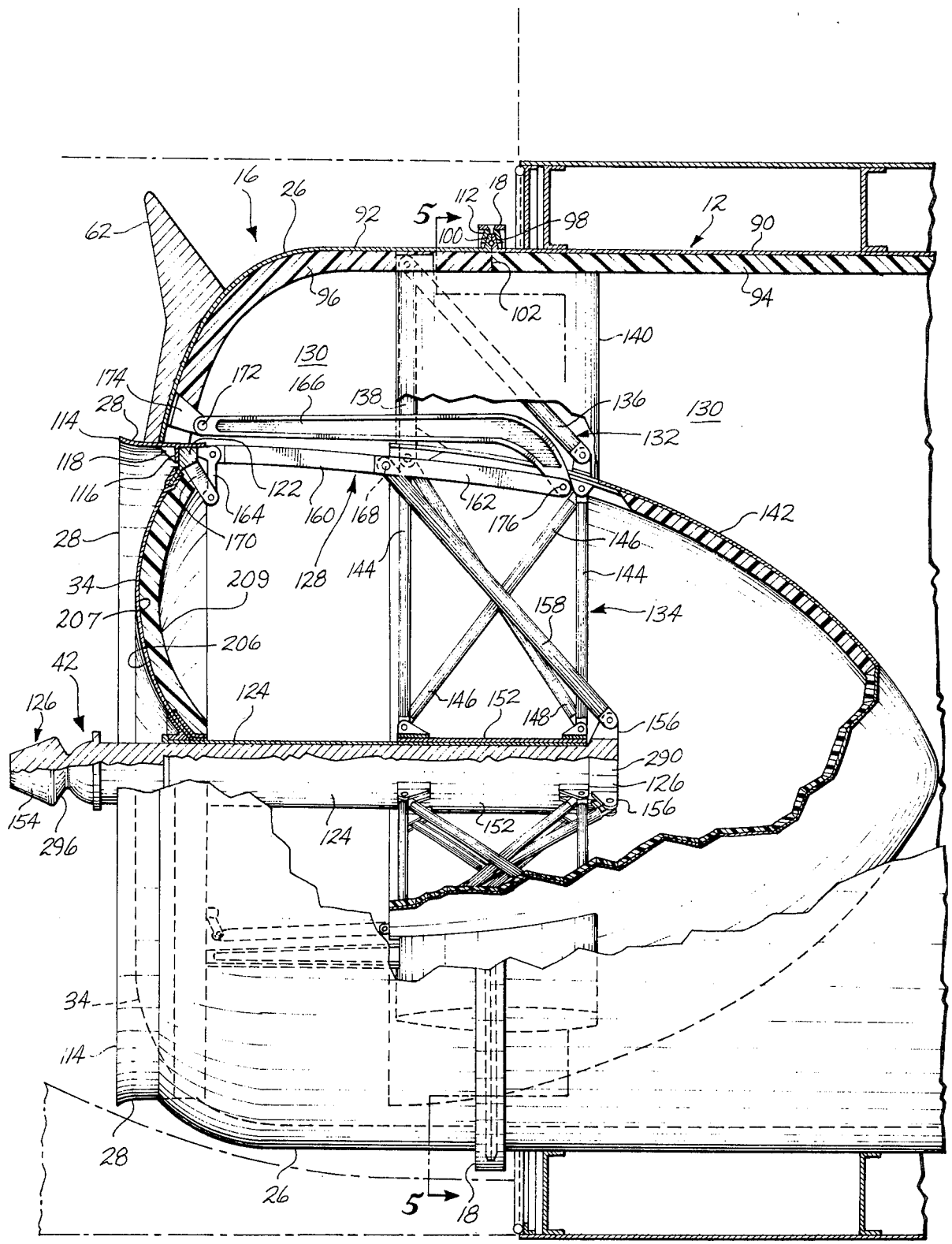
FIG. 2 is a partially sectioned side elevation view of the receptacle and valve element carried by the aircraft wingtip as illustrated in FIGS. 1a and 1b.

The valve assembly 16 as illustrated in cross-section in FIG. 2 includes a housing 26 of generally hollow cylindrical configuration which physically forms an end portion of the tubular wingtank 12. A forward axial end of housing 26 is turned in to partially close the front or forward housing end, with closure 34 sealing the remaining opening. The walls of the tank and valve housing 26 are comprised of metal shells 90 and 92 respectively lined with two-inch-thick layers 94 and 96 of polyurethane thermal insulation. The coupling between the open end of the tank 12 and the mating end of valve housing 26 is formed at the abutment of the polyurethane insulation segments 94 and 96 and annular flanges 98 and 100 which are integral with tank 12 and housing 26, respectively. These mating ends of segments 94 and 96 are slightly compressed when joined to form a vapor sealed annular joint 102 between the tank and housing which is held in union by the quick-disconnect clamp mechanism 18.

As can be seen in FIG. 3, the annular flanges 98 and 100 along the joint 102 are integral to the tank and valve housing shells 90 and 92 respectively. The confronting faces of flanges 98 and 100 are formed to include an annular step 104 which assures exact relative positioning of the assemblies when the surfaces are mated. Annular recesses 106 and 108 in the faces of the flanges cooperate when joined to form a channel within which a rubber O-ring seal 110 resides. The channel cross section is dimensioned such that when the flanges are mated, the O-ring of seal 110 is compressed and distorted against the channel faces to form a positive liquid and vapor-tight seal. The outside faces of the flanges 98 and 100 are tapered in a manner to provide a seat for a channel shaped ring clamp 112 which resides over the outside surfaces of flanges 98 and 100 and a band clamp 18, riveted to the ring clamp 112 circumferentially retains the clamp in place. The band clamp 18 is of a type commonly known in the art of cooperage which employs a screw device or the like (not shown in the figure) to effectively draw the ends of the clamp together, thereby effectively decreasing the diameter and securing the clamp in place. It can be seen that the entire valve assembly 16 including its housing can be removed from the aircraft for maintenance or replacement in a manner of minutes simply by loosening and removing clamp 18 and with it clamp 112.

Referring to FIG. 4, receptacle 28, shallow in axial dimension, is flared about its outward periphery 114 to facilitate entry of the loading boom. A radially inwardly extending flange 116 on the receptacle casting provides a valve seat on a rear face 117 against which a resilient peripheral seal 123 on rigid stiffening ring 122 of disc closure 34 seats. As described herein, ring 122 is locked against the flange 116 from inside of housing 26. Flange 116 is structurally strengthened by a plurality of circumferentially disposed gussets 118 located adjacent the forward face of the flange as illustrated.

Figure 5:
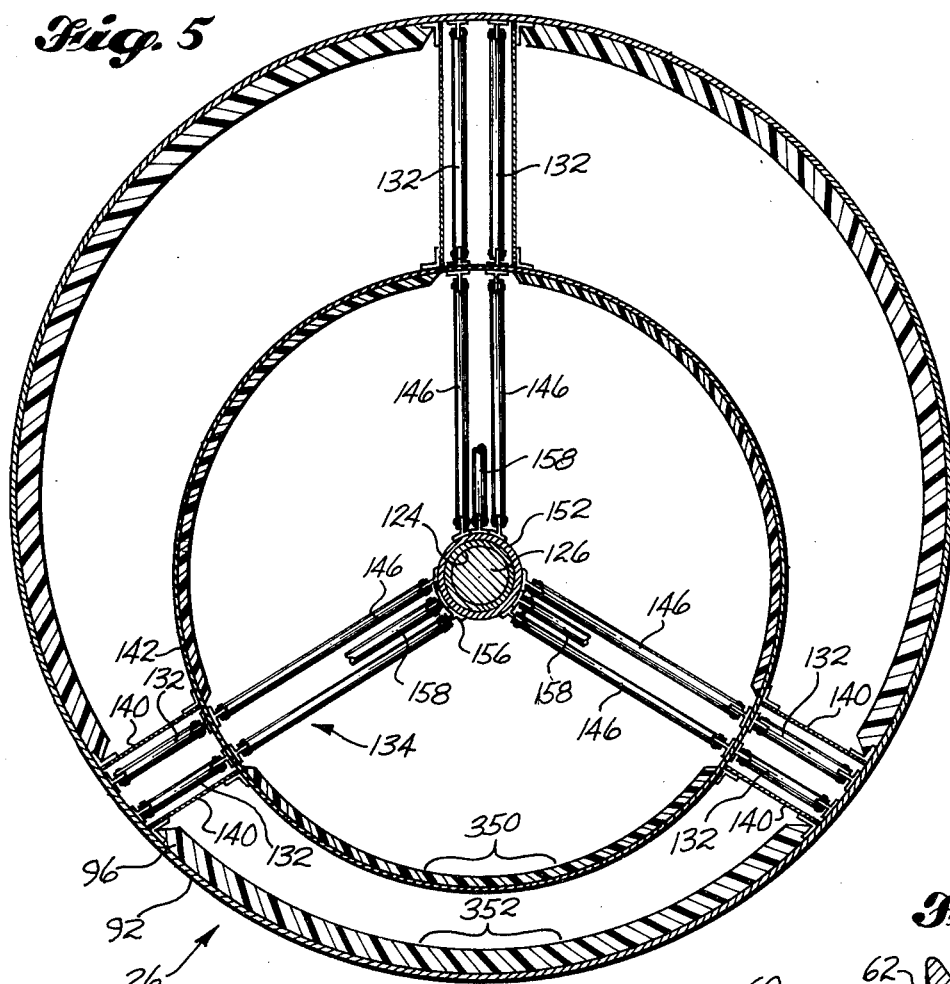
FIG. 5 is a cross-sectional view of the aircraft receptacle and valve assembly taken generally along the section lines 5—5 shown in FIG. 2.

Referring to FIGS. 2 and 5, the aircraft valve assembly 16, in addition to disc closure 34, includes a hollow cylindrical valve stem 124, an axially slidable plunger 126 and toggle locking means provided here by linkages 128. These components are supported within the valve housing 26 and thus within the fluid flow channel 130 on three sets of identical radially extending truss structures disposed at 120° circumferential intervals about the valve assembly axis as best illustrated in FIG. 5. Each truss structure is comprised of dual, circumferentially spaced apart inner and outer sections 132 and 134 respectively to accommodate toggle linkage between each dual set of structural trusses.

Each radially outer dual truss section 132 consists of two sets of fixed supportive members 136 and 138 housed in a fairing 140 of a streamlike cross section which smoothes the fluid flow past members 136 and 138 and which is itself structural. Each set of fixed members 136 and 138 and fairing 140 of the outer truss section 132 structurally interconnect the shell 92 of housing 26 with a bullet-shaped shroud 142 enclosing the radially inner dual truss sections 134 and partially housing toggle linkages 128. Inner truss sections 134 provide fixed structural support for an axially disposed hollow cylindrical sleeve 152 within which valve stem 124 is axially reciprocal. Each inner truss section 134 is here constructed of two sets of structural members 144, 146 and 148, partially cut away in the figure as an illustrative expedient, which are connected to sleeve 152 securing it in place. The valve stem 124 is, itself, a hollow tubular or cylindrical structure and fixedly supports adjacent its forward end the semi-toroidally shaped disc closure 34. Disc closure 34 is provided with a central opening at its connection to stem 124 in registration with the stem opening for receiving lock-unlocked plunger 126, which slidably resides coaxially within the tubular stem 124.

Disc closure 34 is formed of relatively thin wall metal material and is contoured for conftaining the liquid pressure which will be developed on the rear or interior wall of closure 34 during full load flights. Also the contouring of the outer disc face 206 accommodates the camming operation of the boom carried actuator means as discussed more fully herein. The contouring preferably takes the form of an axial end section of a hollow, toroidal shaped body, with the outcurve or convex portions of the semitoroidal shape facing outwardly and forwardly of the valve assembly such that the thin wall disc material functions as a pressure vessel converting liquid pressure loads applied against interior surface 207 through thermal insulating layer 209 into tension loads. These loads are tangent to the contour of disc closure 34 and are resisted by the structural support at the outer and inner edges of the toroidal section, namely, ring 122 and stem 124.

Plunger 126 is contoured on its protruding forwardmost end 154 to accept cooperating actuator means carried by boom valve assembly 36. On the other end, plunger 126 is equipped with flanges 156 in radial planes in between dual inner and outer trusses 132 and 134 to which the toggle linkages 128 are pivotally attached for articulation between the truss sections.

Plunger 126 is the root element in the aircraft valve actuation and locking mechanism. It is depressed into the face of disc closure 34 and into hollow valve stem 124 by boom mounted actuator means. In response to this actuation, plunger 126 drives three identical, radially disposed toggle linkages 128 in unison to a position which effects unlocking of valve closure 34. Thereafter, closure 34 is driven rearwardly by boom valve assembly 36 as described more fully herein.

Each toggle linkage 128 is comprised of a reaction link 158, overcenter toggle links 160 and 162, valve lock link 164 and a tension link 166. The individual toggle linkages 128 here reside in a radial plane in between each dual truss section as shown in FIG. 5.

Describing one of the three identical linkages 128, the reaction link 158 is pivotally connected at one end to a radial flange 156 on plunger 126 and on the other end to a spring-loaded overcenter toggle joint pivot 158 joining toggle links 160 and 162 at adjacent ends thereof. The valve lock link 164 is pivotally mounted to a fixed flange 170 on the periphery of the disc closure 34, as shown, and is pivotally joined at its opposite end to an end of overcenter toggle link 160. Tension link 166 extends rearwardly of the assembly between a pivot 172 on a flange 174 fixedly carried by valve housing shell 92 and a floating pivot 176 with the end of the second overcenter toggle link 162.

Figure 10:
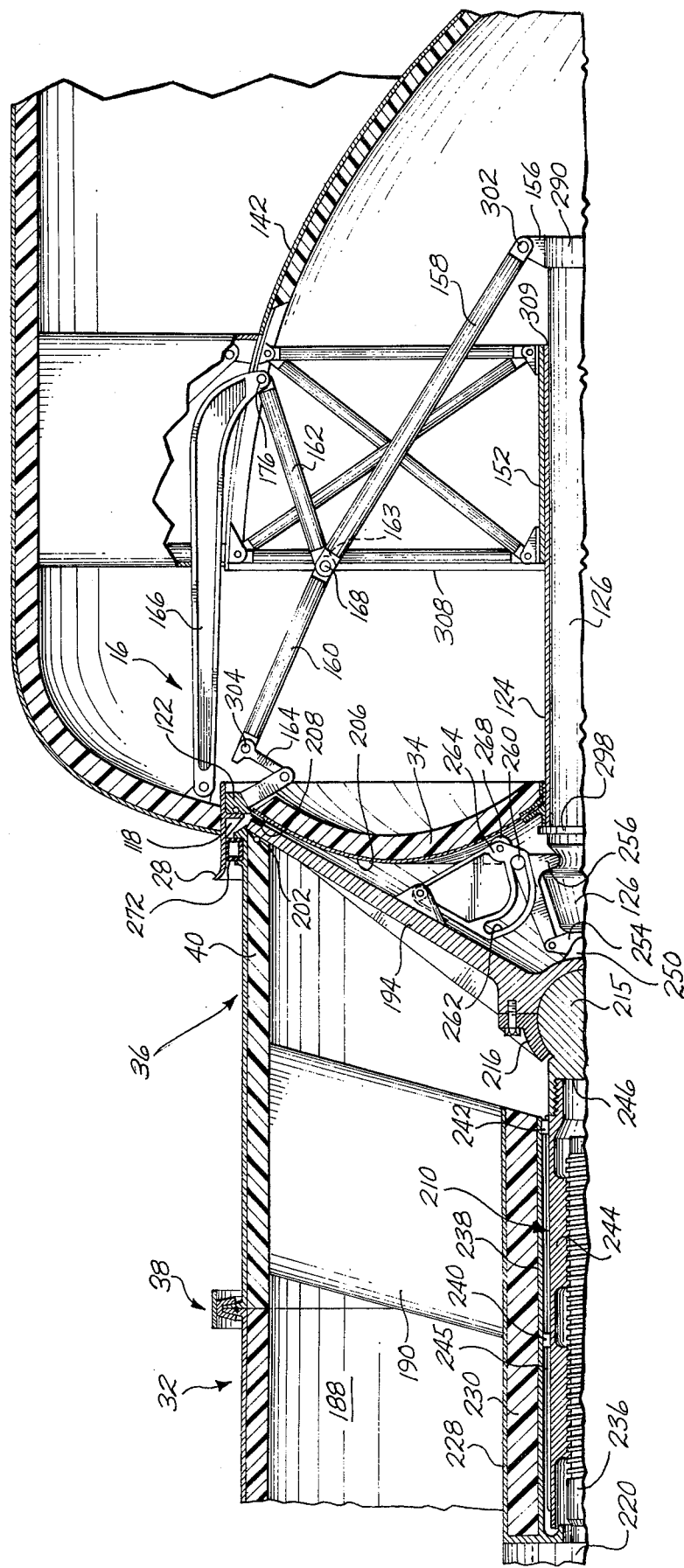
FIG. 10 cross-sectionally illustrates the aircraft receptacle with the boom mated therein and with the aircraft valve assembly unlocked.

The three linkages 128 working in unison are operated by the lock/unlock plunger 126 which is driven rearwardly into the aircraft valve assembly as a result of physical movement of the boom toward seating with receptacle 28 and thereafter by actuation of the boom valve closure as it is power-driven to a forward open position. In response to this movement of plunger 126, reaction link 158 releases overcenter toggle links 160 and 162, which in the overcenter locked position, as shown in FIG. 2, function as rigid links substantially aligned, applying a compression locking force between pivot 176 on link 166 and the valve lock link 164. This overcenter locked condition normally holds disc closure 34 firmly seated on the valve seat flange 116 of the annular alignment receptacle 28. Toggle links 160 and 162 may be spring biased toward their overcenter locked relationship by a torsion spring 163 coaxial with the pivot axis as shown in FIG. 10.

Figure 11:
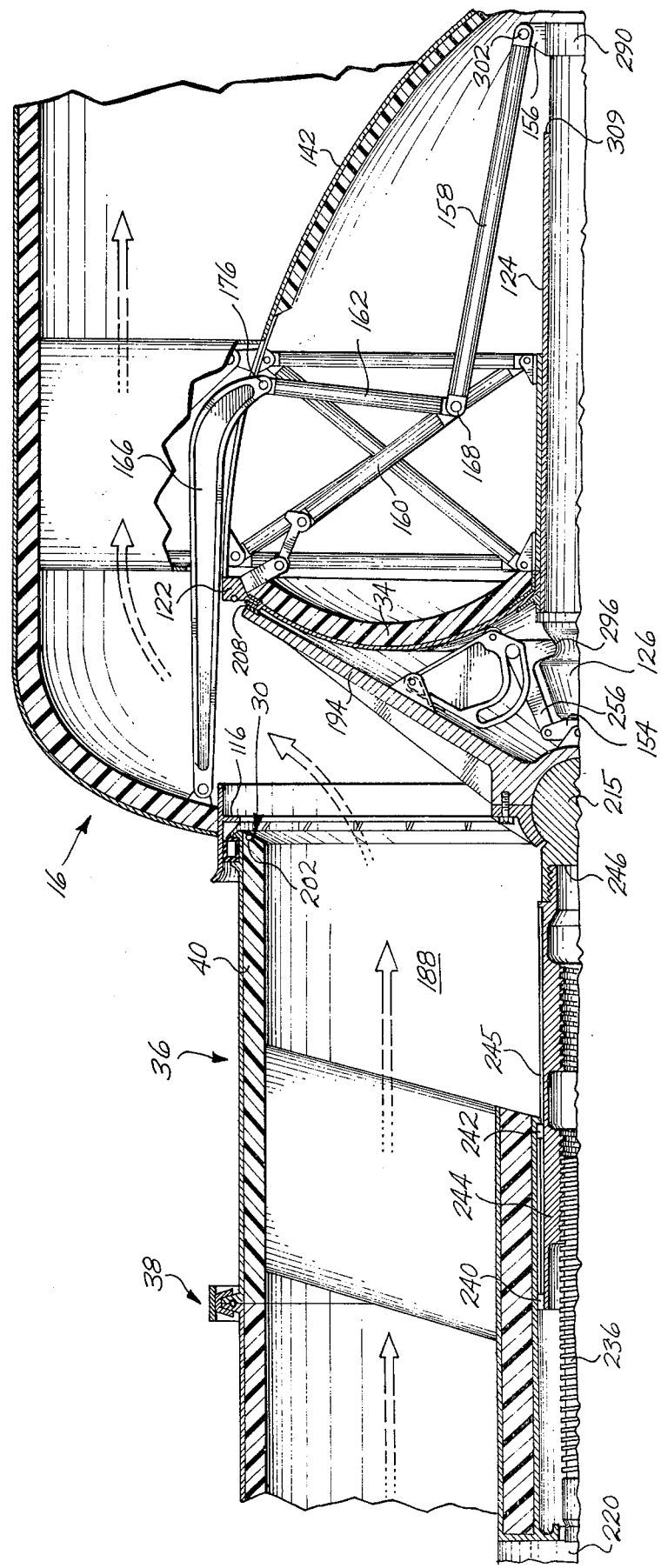
FIG. 11 cross-sectionally illustrates the valve elements of the boom and aircraft fully actuated to an open position, such that fluid transfer may occur.

To unlock the aircraft valve, reaction link 158 draws the toggle links 160 and 162 out of the overcenter locked position such that they fold or collapse upon themselves about the toggle pivot 168 as shown in FIG. 11. Toggle links 160 and 162 thus remove the compression or bearing force from the valve lock link 164 rotating it away from bearing contact on the closure disc ring 122. A more detailed sequential description of the valve lock/unlock actuation cycle is set forth hereinafter.

From the foregoing description, it can be seen that the physical length of the overcenter toggle links 160 and 162 and the length of link 166 are important to proper seating and positive locking of the disc closure 34 on the valve seat flange 116. Moreover, this seating and positive locking of the closure disc must be maintained, notwithstanding the extreme temperature ranges to which the mechanism is subjected when transporting cryogenic liquids, having temperatures as low as minus several hundred degrees. It is an important feature of this embodiment of the invention that the various linkages associated with the valve closure automatically compensate for extreme temperature changes.

In particular, since the link 166 transmits by tension all of the internal valve locking loads through the toggle links 160 and 162 into the fixed structure of the valve housing shell 92 adjacent the valve seat flange 116, and since the toggle links, when in an overcenter locked condition, cumulatively achieve an almost identical physical length to the tension link, thermal compensation is automatically provided. Any thermal expansion or contraction exhibited by toggle links 160 and 162, is equalled by the same thermal effects on the link 166, thus cancelling any otherwise serious length differential in the overcenter toggle linkage, and maintaining disc closure 34 locked closed under a constant and predetermined locking force.

With reference to FIG. 6, as in the case of the above described aircraft receptacle and valve housed in the aircraft wingtip structure, the boom valve mechanism mounted in the end of the ground-based loading boom is a poppet valve in that it is operated by being lifted from its seat. Moreover, the boom valve interacts with and motivates the passive aircraft valve element in two successive steps. First, as aligned and extended toward the aircraft valve by the boom positioning system, mechanical actuator means on the outer face of the boom valve means engages and depresses plunger 126 and thus unlocks the associated valve locking toggle linkages as discussed above.

Secondly, the boom valve drive means is energized to drive both valve elements into the aircraft receptacle housing and in doing so, opens the valves for flow of liquid from the boom into the aircraft tanks or vice versa. Conversely, by operating the boom valve drive means in a reverse direction, after completing a liquid transfer, the appliances at the valve interface function to close and relock the aircraft valve disc closure 34.

With reference to the partial cross-sectional view of the boom valve element 36 in FIG. 6, it can be seen that the cylindrical valve housing 40 forms an extension of an end segment 54 of the loading boom 32. Both the housing and outer boom segment 54 are comprised of cylindrical metal shells 178 and 180 respectively, lined with 2 inch thick polyurethane thermal insulation layers 182 and 184. One axial end of valve housing shell 178 defines the boom end 30 and is terminated in an annular flange 185 with a first external face 120 obliquely disposed to the axis of the valve and a second face 187 transversely disposed to the boom axis. As boom end 30 moves toward seated engagement with receptacle 28, oblique face 120 clears gussets 118 allowing penetration of the loading boom into the receptacle for properly positioning an inflatable seal means on the boom for cooperation with an interior circumferential wall of the receptacle.

The boom valve assembly is mated and secured to the loading boom end segment 54 via its housing 40 in a manner similar to the attachment of aircraft valve assembly 16 to the tubular wingtank. The attachment is by way of a quick-disconnect circumferential clamp 38, best shown in FIG. 3, and can be removed for repair or replacement in a manner of minutes by simply loosening and removing the clamp.

The operative components of boom valve assembly 36 are suspended within the valve housing 40 and boom segment 54 by three radially disposed support struts 190. Struts 190 are of streamlined cross section, so as not to impede fluid flow, and are radially spaced at 120° intervals about the valve axis. The outboard ends of struts 190 are affixed to the housing shell 178 (see FIG. 7). Struts 190 thus suspend the valve mechanism within the cylindrical housing such that the longitudinal axis thereof coincides with the axis of the cylindrical boom flow channel 188.

Referring both to FIGS. 6 and 4, the boom valve closure 194 is symmetrical about an axis aligned with the central longitudinal axis of the boom and preferably is conical in shape with the radially outer, rearwardly facing portions of the convex surface 196 seating on an annular valve seat 198 mounted at the end of the boom valve housing shell 178. Valve seat 198 is provided with a circumferential recess 200 accomodating a compressible O-ring type seal 202. Seal 202 may be provided with an electrical heating element to prevent freezing of the part at the interface seal.

Conical valve closure 194 is geometrically configured and dimensioned such that when the boom valve assembly 36 is aligned and mated with the aircraft valve assembly 16, the exterior or forward concave, conical surface 204 tangentially engages the forward exterior toroidal surface 206 of the aircraft valve closure 34 (see FIG. 10). The point of contact tangency is adjacent the periphery of closure 194, and coincides with a circumferential seal 208 (reference FIG. 4) which is here affixed on the exterior toroidal surface 206 of closure 34 adjacent the outer perimeter thereof. This mating operation seals off the central free space region between closures 194 and 34 in which plunger end 154 and the actuator means carried by closure 194 are locked and prevents the liquid cargo from entering and being trapped therein.

In FIG. 6, a ball-screw drive mechanism 210, hereinafter described in detail, provides positive positioning, in both forward extension and rearward retraction of the valve closure 194, which is desirable in view of the substantial hydraulic pressure applied to surface 212 when the valve is being closed. In addition, interior convex surface 212 of the cone 194 may be reinforced with radially disposed ribs 214.

Valve closure 194 is mounted at its interior, convex axial end for limited radial movement on a ball fixture extension 215 of valve drive mechanism 210 via a collar 216 bolted to the cone. The closure 194 is thus movable on the ball joint permitting universal displacement of the closure axis from the principal valve axis, limited by the dimensions of a gap 218 between a face on the collar 216 and an annular face about the neck of the ball extension 215. Closure 194 is thus self-centering since the axial displcement of the cone permitted by the gap 218 compensates for small axial misalignment between the boom and aircraft valve elements as they are positioned together for mating, with the radially outer portions of toroidal closure disc 34 defining a spherical surface at the points of contact with conical closure 194 for self-seating thereof.

A valve mechanism cover 192, axially disposed in the flow channel 188, houses the valve system drive motor 220, screw mechanism 210 and related motive or drive means, and is in two sections; a motor housing 222 and a ball-screw drive housing 224. Both section housings are generally comprised of metallic shells 226 and 228 respectively, lined with polyurethane layers 230 and 232 to insulate the housed mechanisms from the effects of the extremely low liquid temperatures. In the alternative, the drive motor and ball-screw housing 222 and 224 may be selected from available equipment capable of operating at cryogenic temperatures while directly submerged or otherwise directly exposed to the liquified gases, and accordingly the layers of insulation may be omitted.

Motor housing 222 of motor 220 is detachable from the ball-screw drive housing 224 for maintenance purposes and is bullet-shaped to offer as little impedance as possible in the fluid flow channel 188. Drive motor 220, embedded in polyurethane 232 in the housing 222, is provided with a spline socket which mates with splines 234 on the end of the ball-screw 236 to couple the motor output thereto.

Ball-screw drive housing 224 provides a cylindrical mounting sleeve 238 about which suspension struts 190 are attached and which also functions to house the elements of the ball-screw drive which is of the rotating screw, translating threaded follower type. Sleeve 238 internally accommodates several bearing rings 240 and 242 within which an internally threaded drive sleeve 244 slidably resides. Drive sleeve 244 resides in threaded union with elongate screw 236. The end of the drive sleeve 244 is connected by threads 248 to a base portion 246 of ball extension 215, and relative rotation of drive sleeve 244 is resisted by a longitudinal key 245 on the exterior circumference of the sleeve which coacts with mating keyways in bearing rings 240 and 242.

The forward, concave face or surface 204 of the conical valve closure 194 accommodates actuator means, here including abutment means for depressing lock/unlock plunger 126 (see FIG. 2), protruding from the face of the aircraft valve element closure disc 34, and retraction finger means for subsequently withdrawing the plunger back to its normal protruding position. The abutment means and finger means cooperatively and simultaneously drive the plunger inwardly to unlock the aircraft valve closure and simultaneously grasps it for later withdrawing the plunger to relock the closure.

The actuator means here includes a flange 250 mounted on a protrudence 252 on the exterior, concave center of closure 194 which pivotally mounts at its center, an abutment link 254. Pivotally attached to link 254 at each end thereof are retraction fingers 256. Fingers 256 are generally elongate and here angular in shape, that is L-shaped, with catch portions 258 for engaging an annular groove 296 on the end of plunger 126. Cam followers 260 are provided at the non-pivoted ends remote from mounting link 254 and are slidably engaged within contoured slider slots 262 in retraction finger drive cams 264.

Means are provided in the form of drive cams 264, pivotally mounted on flanges 266 on surface 204 of closure 194, for actuating fingers 256. The fingers and associated camming means are held in an unactuated condition by means such as torsion spring members 267. Cams 264 accommodate at their forwardmost extremities relative to the closure surface 204, rotatable cam follower wheels 268. Wheels 268 are the first elements of the boom valve mechanism to contact the aircraft valve during mating, engaging the curved toroidal surface 206 at points which recede from the interface toward the center of closure 34.

Thus, as the valve assemblies are moved closer together by positioning of the boom, wheels 268 move inwardly along the curve of the toroidal surface toward the central lock/unlock plunger thereby rotating the drive cams 264 inwardly about their mounting pivots. Rotation of the camming means rotates retraction fingers 256 about their pivots through the interaction of the cam followers 260 within the drive cam slots 262. Fingers 256 are thus articulated to engage the annular groove 296 in plunger 126 and, thereafter, reciprocably disengage the groove upon withdrawal of the boom. Annular groove 296 thus serves as a detent means on plunger 126 to permit fingers 256 to grasp and withdraw the plunger during retraction of the boom valve closure 194.

A flat surface 270 on the central link 254 is the second element of the boom valve to contact elements of the aircraft valve during engagement. This surface serves as an abutment means to abut the axial end of the lock/unlock plunger 126 and press the plunger in as the valve assemblies are moved together. The plunger is depressed in concert with the engagement of the retraction fingers 256 with the annular groove 296 on the plunger. It should also be noted that the central link 254 is pivoted at its center such that if the valves are not precisely axially aligned as permitted by the gap 218 adjacent the ball joint extension 215, as previously described, the central link will pivot to directly engage the end surface of the plunger.

An important feature of housing 40 (FIG. 6) is the provision of an inflatable seal 272. This seal shown in detail in FIG. 8 is a continuous circular member or bladder 274 similar to a bicycle innertube which encircles the end of the valve housing 40 as it resides in an annular circumferential recess 276 defined by flanges about the end of the housing shell 178. As the valve assemblies are moved toward engagement, as described in detail herein, and upon reaching a particular proximate relationship as determined by sensory switches, the seal is inflated from a pressure manifold as illustrated in FIG. 4.

Inflation of the seal swells its diameter until bladder 274 engages the inside surface 278 of the aircraft alignment receptacle 28. Further inflation presses the bladder against surface 278 to effect a positive liquid and vapor-tight seal. Inflation of the seal takes place prior to opening of the fluid control valves thereby preventing escape of fluids and vapors. Preferably, the seal does not protrude from its annular recess 276 in the deflated state so as not to obstruct insertion of the boom end into nested seating with receptacle 28. For this purpose the seal bladder 274 is made to collapse upon itself as shown in FIG. 8. Provision for deflating the seal to its collapsed disposition within recess 276 can be accomplished in several ways. For example, the bladder may be designed of a cross section which dictates that it naturally folds upon itself when in a quiescent deflated state, or the bladder can be made to fold upon itself by partially evacuating its interior of air upon deflation so as to force it into the collapsed condition.

Air pressure for inflating and/or deflating bladder 274 may be fed along the boom from a controlled air source, through hoses or other conduit means to recess 276 and coupled to bladder 274 by suitable fitting means (not shown).

Boom alignment sensor assembly 60 is mounted on an upper surface of the boom valve housing 40 at the outer, forward extremity of the loading boom. It is so situated that in a cargo transfer situation, the probes 66 of assembly 60 are the first boom components to contact the aircraft structure. As these probes 66 contact target cone 62 (see FIGS. 9a,b) on the aircraft structure, the assembly 60 generates differential electrical signals which represent servomechanism error signals for guiding the boom relative to the axis of the aircraft receptacle and valve elements. As will be described herein, the boom servomechanism system translates these differential signals into physical movements of the boom to correct for misalignment.

Figure 9A:
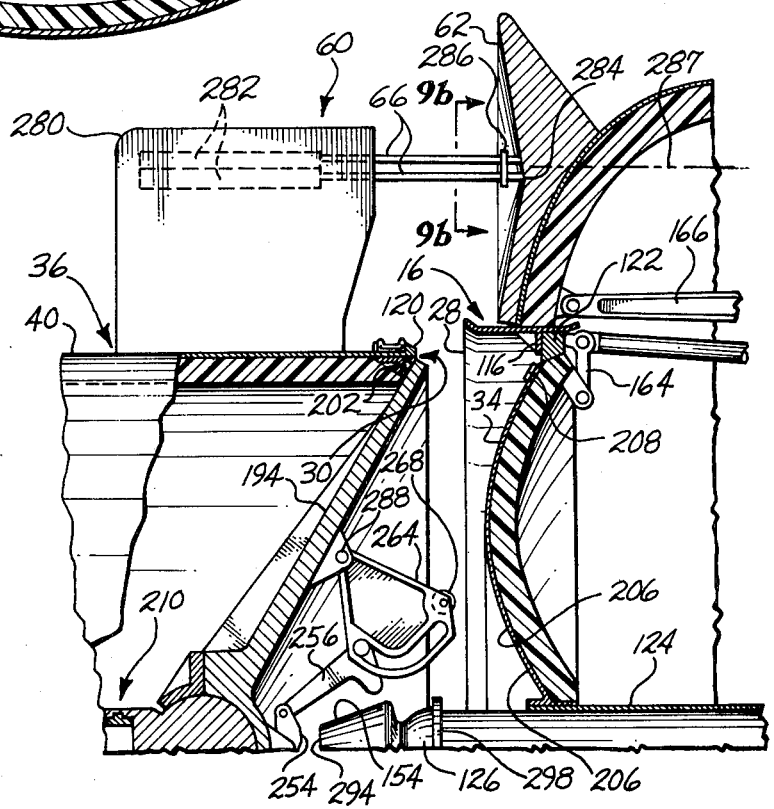
FIG. 9a is the first of a series of three figures (9, 10, and 11) illustrating the sequence of alignment, mating and actuation of the boom and aircraft valve elements. This figure cross-sectionally illustrates the valves in alignment and the position of boom sensor probes in contact with an aircraft mounted target cone.
Figure 9B:
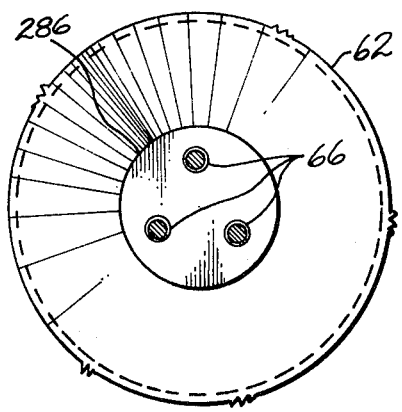

With reference to FIGS. 9a, b and FIG. 12, the sensor mechanism 60 is comprised of a protective shroud 280 which houses three transducers 282 of the linear variable differential transformer type, each of which accommodates along its axis a sensory probe 66 which is spring loaded to a longitudinally extended position. More particularly, transducers of this type include stationary signal windings which are variably electromagnetically coupled by a movable magnetic core carried by each probe 66. The longitudinal axis of the transducer probes are arranged in a parallel array forming a three point triangular relationship as shown in FIG. 9b. The electrically conductive probes are yoked together toward their low wear ceramic tips 284 by a keeper 286 which maintains their radial spacing on the target cone under the compression of their respective loading springs.

The transducer probes are so mounted that upon achieving perfect alignment of the valve elements on a common longitudinal axis, the central axis of sensor assembly 60 will assume a position coincident with the axis 287 of the target cone 62. In this condition of perfect alignment, the tips of the three probes will be in simultaneous contact with the target cone, equally depressed, and the transducers will produce signals of equal magnitude which when compared with one another represent an electrical null condition indicating a zero positioning differential or error. Any lateral, vertical or angular deviation from perfect axial valve alignment will cause unequal displacement of probes 66 and result in a differential error signal. As discussed more fully herein, these transducer differential output signals are fed to the boom positioning servo system to drive the boom toward proper alignment to achieve a null transducer output.

VALVE ENGAGEMENT AND ACTUATION

FIGS. 9, 10 and 11 schematically illustrate the sequence of alignment and mating of the boom and aircraft valve members and the ensuing actuation of the valves in unison to permit fluid transfer. FIG. 9a illustrates what can be termed the alignment phase with both valve assemblies 16 and 36 closed and with the end 30 of the boom moving toward the aircraft valve alignment receptacle 28.

During this time, tips 286 of the sensing probes 66 contact target cone 62 causing their respective transducers 282 to generate differential boom positioning signals which resultantly cause the boom to be driven toward ideal alignment, that is, both valve elements on a common axis. Ball-screw drive mechanism 210 of the boom valve assembly 36 is fully retracted holding conical closure 194 tightly sealed against the peripheral O-ring seal 202 on valve housing 40. In FIG. 9a, retraction finger cams 264 are held extended by their spring-loaded pivots 288 such that they in turn hold the retraction fingers 256 in a radially outward out-of-the-way position to admit the knob-like end 154 of lock/unlock plunger 126 on the aircraft valve assembly 16. Valve assembly 16 is generally represented in FIG. 9a with disc closure 34 thereof in a closed position.

Simultaneous axial alignment and advancement of the boom continues until the cam wheels 268 on cams 264 contact toroidal face 206 of closure disc 34. Almost simultaneously therewith the central link 254 abuts end 294 of lock/unlock plunger 126 and starts pressing the slidably engaged plunger into hollow cylindrical valve stem 124, displacing circumferential flange 290 carried at the end of plunger 126 rearwardly from axial end 309 of valve stem 124.

The boom continues to advance until end 30 seats in receptacle 28, during which, plunger 126 continues to be displaced inwardly. Similarly, probes 66 are depressed into their respective transducers 282 and cam follower wheels 268 ride down the receding face 206 of closure disc 34 toward center to cause engagement of retraction fingers 256 with annular groove 296 on the plunger 126.

The alignment phase characterized by boom movement as described above continues until seating of the boom end 30 is achieved as shown in FIG. 10. One or more microswitches (not shown) are carried by boom end 30, mounted in face 187, to function in a well-known manner as limit switches for terminating movement of the boom drive means when end 30 seats within receptacle 28 and for triggering inflation of seal 272. Simultaneously therewith, annular flange 298 on the lock/unlock plunger 126 seats against the front end of hollow valve stem 124, and retraction fingers 256 engage groove 296 on the end of plunger 126.

In this state, it is observed that radially outer portions of the front face of conical closure 194 of the boom valve assembly 36 have tangentially engaged radially outer portions of toroidal face 206 of the aircraft valve closure disc 34, compressing the circumferential seal 208 on the disc. Thus, the valves are physically engaged for joint actuation and plunger 126 has been displaced to unlock closure disc 34, by drawing reaction link 158 away from the receptacle opening as pivot 302 is forced rearwardly with plunger 126. This pulls the overcenter toggle links 160 and 162 out of their overcenter locked condition causing them to fold upon themselves, removing the compression brace between pivot 176 on tension link 166 and pivot 304 on valve lock link 164 and withdrawing lock link 164 about its pivot 306 away from its locked position bearing against closure seal 122 of disc 34.

FIGS. 10 and 11 illustrate the valve actuating phase, that final step in the sequence following alignment and engagement, which simultaneously opens both valve elements and permits fluid flow. With the mechanisms disposed as shown in FIG. 10, the actuation phase is initiated by energizing ball-screw drive motor 220. Resultantly, ball-screw 236 is driven in rotation about its axis and by its threaded union with the follower drive sleeve 244 and its specific direction of rotation, displaces sleeve 244 within its ring bearings 240 and 242 longitudinally of the boom toward valve housing 40.

This drives conical valve closure 194 outwardly thereby opening the flow channel 188 by displacing closure 194 from its O-ring seals 202. At the same time, closure 194 and central link 254 press against the closure disc 34 and lock/unlock plunger 126, respectively, and displace the closure disc 34, hollow valve stem 124 and plunger 126 as a unit.

Ball-screw 236 continues to advance the drive sleeve 244, and thus valve closures 194 and 34, until the peripheral seal 122 on disc 34 abuts against an annular end surface 308 of bullet shaped shroud 142 serving as a rear limit for the displacement of closure 34. At that instance, one or more microswitches (not shown) mounted adjacent traveling sleeve 244, and operating in response to the position thereof as limit switches in a well-known manner, sense that the boom closure and aircraft closure have been displaced to their full extent and de-energize drive motor 220. Alternatively, these microswitches or other electrical sensors may be mounted at any suitable location for detecting the mechanical limits of the displaced valve elements.

The valve closures are now fully open allowing fluid transfer. Note that the fluid flowing through the boom valve impinges on the back sloping convex face of conical closure 194 and is thus deflected outwardly about and around the exterior of shroud 142 forming a composite passage which presents low impedance to the fluid flowing through the coupled assemblies.

Closure of the valve elements and disengagement of the boom from receptacle 28 is essentially the reverse of the sequence just described. Referencing FIG. 11, closure of the valves is initiated by energizing the drive motor 220 in reverse thereby withdrawing the assembly of elements through the action of the ball-screw 236. This operation draws the lock/unlock plunger 126 outwardly by means of retraction fingers 256 engaging groove 296 in the plunger. Initially, the boom closure 194 separates from closure 34 to allow flange 290 of plunger 126 to seat against valve stem end 309.

Further travel of sleeve 244 causes closure 194 to be drawn up against boom end 30 and sealed on its O-ring 202, and pulls disc closure 34 via plunger flange 290 and valve stem end 309 toward its seat on the flange 116. During this movement, links 160, 162, 158 and 164 are repositioned so as to urge disc closure 34 to its seated closed position on flange 116 at a greater rate than dictated by the abutment of plunger flange 290 on valve stem end 309. This causes flange 290 and valve stem end 309 to axially separate leaving plunger 126 as shown in FIG. 10. When the disc closure 34 thus seats on the flange 116, it again abuts the boom valve closure as shown in FIG. 10 and plunger 126 assumes its depressed condition relative to hollow valve stem 124 as shown in the figure. At this instant, the before-mentioned limit switches (not shown) associated with traveling sleeve 244 are opened de-energizing drive motor 220 and deflating the inflatable seal 272.

At this time both valves are closed. However, the aircraft valve assembly 16 remains unlocked with the plunger 126 depressed such that the annular flange 298 on the plunger abuts the front axial end of valve stem 124. It is at this point that the boom drive and positioning mechanism is again operated, here in reverse, and the boom is physically moved away from the valve interface. During this motion retraction fingers 256 complete the withdrawal of plunger 126 from valve stem 124, the movement of which is limited by the abutment of raised portion 290 with end face 309 of the valve stem. Moreover, this final displacement of plunger 126 drives reaction link 158 to relock overcenter toggle links 160 and 162, and valve lock link 164.

While boom 32 through fingers 256 initiates the relocking operation, completion of the operation is achieved here by the spring loading of toggle pivots 168 that urge the links 160 and 162 into the overcenter locked conditions.

As boom 32 is moved away from the interface, boom positioning sensor assembly 60 is operative to develop position alignment signals. This assists in guiding the boom during its withdrawal from the aircraft receptacle to avoid damaging inflatable seal 272 and/or receptacle 28.

BOOM POSITIONING AND ALIGNMENT

Although the loading-unloading boom may be supported and guided to and from the receptacle and valve assembly mounted on the aircraft by any number of suitable systems, devices and mechanisms, one particular sensing and guiding system including sensor assembly 60 and the cooperating boom servomechanisms is disclosed herein for completeness. This boom guiding and positioning system is the sole invention of Philip C. Whitener, a coinventor of the present invention.

FIG. 12 is a side elevation view of the ground-based, segmentally extensible loading boom 32 previously illustrated in FIG. 1. As previously stated, boom 32 is supported on a base section 46 which can be rigidly or movably attached to a liquid loading tank 310 as shown in FIG. 1a.

An outermost end 311 of bse section 46 is flexibly and sealingly coupled to a mating end 312 of intermediate boom section 48. Three circumferentially disposed extendible ball-screw actuators 50 of the rotating screw translating nut-type span the intervening jont and interconnect pipe section 46 and intermediate section 48. Actuators 50 are equally spaced 120° apart from the boom circumference, and are pivotally secured to the boom sections on flanges 314 and 316 which permit biaxial flexure of the joint up to 3° maximum in the vertical and horizontal planes.

Intermediate boom section 48 is attached on its outermost end 318 to the end boom section 54 via a flexible shear resistant bellows joint 56. As with the joint between the base section and intermediate section, 46 and 48 respectively, the bellows joint 56 is spanned by three circumferentially disposed extendible ball-screw actuators 58 of the rotating screw translating nut-type. The actuators 58 are cicumferentially spaced 120° apart about the boom, in alignment with actuators 50, and are secured to each boom section on flanges 322 and 324 which permit biaxial flexure of the joint up to 3° maximum in the vertical and horizontal planes.

End boom section 54 is terminated on its outer end in a peripheral flange 326 which mates with a similar flange 328 on the male valve element housing 40, the two being secured and sealed together by the previously described quick-disconnect clamp 38.

During positioning, ground-based loading boom 32 is extended toward the aircraft wingtip while the boom sensor assembly 60 in cooperation with target cone 62 aligns the boom axis 331 with the aircraft valve axis 340 by an electrically controlled powered system including actuators 50 and 58. Coarse positioning of the boom 32 relative to the aircraft valve assembly 16 may be accomplished by operator manipulation of controls which drive the boom actuators. Fine guidance of the boom in the vertical and horizontal planes is here performed by an automatic boom positioning system, operative after the probes of boom sensor assembly 60 engage target cone 62.

When low wear ceramic tips 284 of sensor probes 66 contact target cone 62, only exact alignment of a prime sensory axis 336 with target axis 287 will produce identical outputs from the three transducers 382 thereby indicating a null or zero positioning error. This is true since coincidental axial alignment of the two assemblies will position the probe tips 284 equidistantly from the center of the conical target surface thereby equally compressing the probes 66 as indicated in FIG. 9b. Any radial or angular displacement from this perfect alignment will unbalance the transducer output by unevenly depressing the sensory probes 66. Differences between any two output signals from the three probes are electronically compared to produce unbalanced or differential transducer output signals which are subsequently applied to corresponding servomotors 69 mounted on the base section 46 of the boom and which drive the ball-screw actuators 50 and 58.

Figure 14:
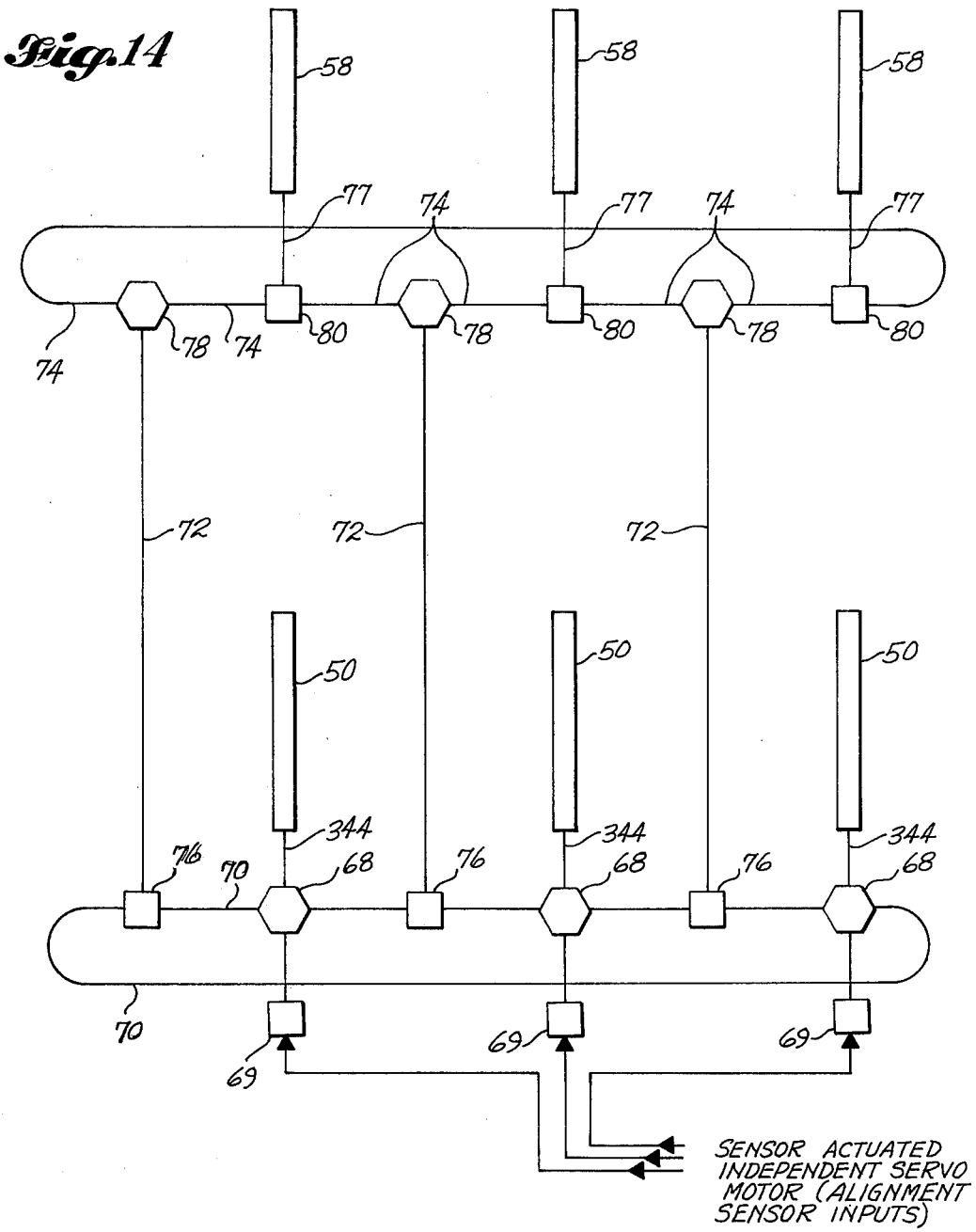
FIG. 14 is a schematic block diagram of the loading boom positioning servo system.

Referring jointly to FIGS. 12, 13 and 14, servomotors 69 are responsive to equal signal magnitudes to effect uniform, straight longitudinal extension and retraction of the boom sections, and responsive to differential or unbalanced signals generated by the sensory transducers 282, to cause angular boom adjustment by driving actuators 50 and 58 to align the boom with the aircraft valve receptacle 28. Axial alignment is achieved by differentially extending and/or retracting actuators 50 by energizing servomotors 69 to drive the actuators through miter boxes 68 and torque tubes 344 to offset section 48, e.g., by an angle ($-a$) from the axis of boom base section 46. Simultaneously, actuators 58 are driven in a dependent manner by servomotors 69 to compensate for the angular displacement ($-a$) of the intermediate section 48 by angulating the forwardmost end section 54 by an amount ($+a$) so as to maintain a parallel relationship between the faces of the valve elements at the coupling interface.

Servomotors 69 perform this secondary drive function through miter boxes 68 which split the rotational drive from servomotors 68 into oppositely directed circumferentially extending torque tubes 70 interconnecting the servomotor drive outputs to differentials 76. Differentials 76 thereupon impart differential rotational drive components to the secondary boom positioning components associated with the interconnection of boom sections 48 and 54. The differential rotational components are transmitted through flexibly coupled longitudinally extendable torque links 72 to miter gear boxes 78 and from there through circumferentially extending torque tubes 74 to differentials 80 on intermediate boom section 48. Ball-screw actuators 58 are in turn dependently driven by differentials 80 via torque tubes 77 so as to angulate boom section 54 by an amount equal and opposite to the independent angulation of section 48 relative to base section 46.

With reference to the diagram in FIG. 14, it should be observed that since the intermediate boom section 48 is supported and positioned by three equally spaced independently driven actuators 50, the three differential signals produced by the transducers 282, and in response to which the servomotors 69 operate, are sufficient to achieve displacement of the boom precisely on any axis lying parallel to aircraft valve axis 340. As the boom is driven toward valve alignment, the differential relationship of the signals produced by the three transducers 282 change relative to one another to reflect the altered positional relationship of prime sensory axis 336 and the target cone axis 287. Upon achieving alignment, the transducers produce a null output corresponding to equal, if any, energization of servomotors 69.

More particularly, the operation of the servomechanism may be explained by considering the positioning of the boom sections 48 and 54 in a single plane. From this, the operation of the system in both planes follows from the geometry of the probes and servomechanisms.

Assuming that the boom is misaligned in the vertical plane, sensor probe transducers 282 will generate a differential signal between the upper probe 66 and both lower probes, the lower probes being equally depressed relation to the unequally depressed upper probe as seen in FIGS. 9b and 12. This differential signal is applied to the servomotor 69 mounted on top of boom section 46 as shown in FIG. 12 causing the motor to drive the associated actuator 50 through miter gear box 68, angulating boom section 48 by angle ($-a$) in the vertical plane. Simultaneously, the rotational drive is split in two directions by gear box 68 and applied to differentials 76 on either side of the driven servomotor 69. In this instance the lowermost differential 76 and the laterally disposed miter boxes 68 and associated actuators 50 remain unaffected.

The two driven differentials in turn drive the associated miter gear boxes 78 which produce opposite rotational outputs on circumferentially extending torque tubes 74. These opposite rotational outputs from gear boxes 78 are equal and opposite at the uppermost differential 80 cancelling any net drive to the associated upper actuator 58. However, the two laterally disposed lower actuators are driven by the action of miter gear boxes 78 through differentials 80 at a rate equal to $\frac{1}{2}$ that of driven actuator 50 so as to angulate end section 56 by a positive angle ($+a$) in the vertical plane, compensating for the angular displacement of boom section 48. Since the lower, laterally disposed actuators 58 are at $\frac{1}{2}$ the distance from the pivotal axis of section 56 compared to the corresponding distance between uppermost driven actuator 50 and the pivotal axis of section 48, only $\frac{1}{2}$ of the rotational drive (or $\frac{1}{2}$ the extension of the actuators) is required to effect the necessary angulation of boom section 56.

LOADING/UNLOADING GROUND STATION

With reference to FIG. 1a, unloading of the liquid cargo is efficiently and quickly accomplished by a gravity flow system afforded by a loading-unloading station having a transversely inclined surface 346 for the aircraft adjacent boom 32. By providing an inclination of surface 346 at a predetermined angle (b), the aircraft transport is disposed with the aircraft valve assembly 16 in wingtip 10 at the lowestmost level relative to the liquid stored in the aircraft wingtanks. Accordingly, during unloading, the liquid cargo flows by gravity feed outwardly through the aircraft valve assembly and into boom 32 and, from there, through valve-controlled unloading conduit means 348. To insure efficient emptying of the aircraft tanks, the opening associated with valve assembly 16 is disposed below the center line of the aircraft wingtank 12 as shown in FIG. 5. Thus, a lower margin 350 of the aircraft valve opening, here shown as a cross section of a bullet-shaped shroud 142, is positioned only slightly above the lower margin, or lower inner wall 352 of storage tank 12 to insure substantially complete drainage during the gravity unloading.

Loading is also accomplished by a gravity feed. For this purpose, an elevated loading tank 354 is communicated with boom 32 by pipe 356 connected to section 46. Tank 354 is filled by a fill pipe 358, connected to a suitable pump (not shown) for forcing the fluid up into the elevated tank through pipe 356. Appropriate control valves are provided, such as indicated at 360, 362, and 364, for properly directing the fluid during the filling of tank 354 and during loading and unloading of the aircraft.

It will be understood that numerous changes in the details, materials, steps and arrangement of parts may be made to the particular embodiment of the invention described and illustrated herein without departing from the spirit of the invention. For example, valve assembly 16 and boom 32 may be employed as a coupling apparatus for transferring liquid to and from a sea-tanker with the boom being mounted on a loading platform, such as a dock, for cooperation with the valve assembly corresponding to assembly 16, mounted at a intake cargo port on the ship. Accordingly, the foregoing disclosure and description thereof are for illustrative purposes only and do not in any way limit the invention which is defined only by the following claims.

What is claimed is:

1. In a coupling apparatus for loading and unloading liquid to and from a transport and including a valve assembly mounted on said transport and a liquid conducting hollow boom positionable with respect to said transport and having a valve assembly at its positionable end for mating engagement with said transport valve assembly, the combination therewith comprising:

movable valve closure means and toggle locking means therefor mounted in said transport valve assembly, said toggle locking means having a locked condition in which said transport valve closure means is held in a locked, closed position and having an unlocked condition in which said transport valve closure means is unlocked and is free to move to a open valve position;

plunger means mounted in said transport valve assembly and connected to said toggle locking means and being movable from a normal unactuated position to an actuated position to cause said toggle means to assume its unlocked condition, and being movable from said actuated position back to its unactuated position to cause said transport valve closure means to assume its closed position and to cause said toggle means to assume said locked condition;

actuator means carried by said boom valve assembly and engagable with said plunger means for displacing it to its actuated position upon movement of said boom into mating engagement with said transport valve assembly and for withdrawing said plunger means toward its normal, unactuated position upon movement of said boom out of said mating engagement;

said boom valve assembly including a movable valve closure means and motive means for displacing said boom closure means from a normally closed position adjacent said boom end to an open position spaced therefrom; and said boom valve closure means being engagable with said unlocked transport valve closure means duriing said mating engagement of said valve assemblies for forcibly impelling said transport valve closure means to its open position in unison with said boom valve closure being displaced to its open position.

2. The combination set forth in claim 1, wherein said transport valve assembly has a housing provided with a receptacle means for receiving said positionable end of said boom in said mating engagement and an opening in said housing adjacent said receptacle means defining valve seat means; said transport valve closure means cooperating with said valve seat means and including valve stem means extending therefrom internally of said housing; valve stem guide means mounted internally of said housing and slidably receiving said valve stem means for allowing movement of said transport valve closure means between said closed position in which it is seated on said valve seat means and said open position in which it is displaced internally of said housing apart from said valve seat means; and said plunger means being carried by said transport valve closure means and slidably mounted with respect thereto for movement between said unactuated position with said transport valve closure means in its locked closed position and its actuated position slidably displaced relative to both said transport valve closure means and said housing.

3. The combination in claim 2, wherein said boom defines a longitudinal axis and said boom valve closure means is mounted in said boom valve assembly for movement between said closed and open positions along said axis, and said valve guide means and slidably mounted valve stem means and plunger means are mounted for movement between their respective positions along said axis during said mating engagement of said boom and aircraft assemblies.

4. The combination in claim 3, wherein said receptacle means and opening are disposed at a forward portion of said valve assembly housing and said transport valve closure means and valve stem means thereof comprise a generally disc-shaped closure member and an axially extending hollow cylindrical valve stem member connected at a forward axial end thereof to said closure member and defining a rearward axial end extending internally into said housing, said closure member having a central opening registering with said forward axial end of said hollow valve stem member; and said plunger means including an elongate cylndrical member longitudinally slidably mounted in said valve stem member and having a forward end protruding through said valve closure member for engaging said boom assembly actuator means and having a rearward end connected to and for operating said toggle locking means.

5. The combination as set forth in claim 1, wherein said toggle locking means comprises:

an elongate tension link having first and second ends, said first end connected to said transport valve assembly;

a pair of toggle links having adjacent ends pivotally connected together at a toggle joint and having opposed ends, one of said opposed ends pivotally connected to the second end of said tension link and the other opposed end pivotally connected to said aircraft valve closure means for articulation between said locked condition in which said toggle links are in a stable overcenter substantially aligned relationship extending generally parallel to said tension link and effecting a compression locking force between the second end of said tension link and said transport valve closure means, and said unlocked condition in which said toggle joint of said toggle links has been displaced through said overcenter relationship into a collapsed relationship relieving said compression locking force between said second end of said tension link and said transport valve closure means and freeing said valve closure means to move to said open valve position, whereby the parallel relationship between said tension link and said substantially aligned, overcenter toggle links in said locked condition serves to maintain a substantially constant, predetermined compression locking force on said transport valve closure means, notwithstanding contraction and/or expansion of said links due to temperature variations of said transport valve assembly.

6. The combination set forth in claim 5, wherein aid toggle locking means further comprises:
spring biasing means connected to said toggle links continuously urging said toggle joint toward said overcenter locked condition.

7. The combination set forth in claim 5, wherein said toggle locking means further comprises:
a reaction link connected between said plunger means and said toggle joint for effecting displacement of said toggle joint between said overcenter, locked condition when said plunger means is in its normal, unactuated position, and said collapsed, unlocked condition when said plunger means has been moved to its actuated position.

8. The combination set forth in claim 5, further defined by said tension link being pivotally mounted at its first end to said transport valve assembly adjacent said valve closure means to sustain a tension force between its first and second ends equal and opposite to said compression locking force of said toggle links when the latter are in said overcenter, locked, substantially aligned relationship.

9. The combination set forth in claim 5, further comprising:
a locking link having a first end pivotally mounted to said valve closure means and having a second end pivotally mounted to said end of said toggle links connected to said transport valve closure means, said locking link having a portion adjacent said second end disposed to transmit said compression locking force of said toggle links to and for locking said transport valve closure means.

10. The combination set forth in claim 5, further defined by said transport valve closure means, including a closure member of substantially disc shape movable between said open and closed positions along the axis of said member; said transport valve assembly having an annular valve seat cooperating with a radially outer portion of said disc-shaped closure member adjacent one of the faces thereof; said first end of said tension link being connected to said transport valve assembly adjacent said annular valve seat and said opposed end of one of said toggle links being connected to said valve closure member at a radially outer face portion thereof opposite said above-mentioned face, whereby said compression locking force of said toggle links urges said valve closure member against said annular valve seat.

11. The combination as set forth in claim 1, further defined by said transport valve closure means being substantially disc-shaped and being mounted for movement between said closed and opened positions along the axis thereof; said transport valve assembly including an annular valve seat means mating with an radially outer portion of said disc-shaped valve closure means; said plunger means being mounted for movement between said unactuated and actuated positions coaxially with said valve closure means; and said toggle locking means comprising a plurality of toggle locking mechanisms angularly spaced about said axis of said valve closure means and being jointly connected to said plunger means for operation in unison thereby, and each said mechanism being connected to and for locking said disc-shaped valve closure means in its closed position seated against said annular valve seat means.

12. The combination as set forth in claim 1, further defined by said toggle locking means comprising three said toggle mechanisms circumferentially disposed about said plunger means at equal angular positions about the axis of said disc-shaped valve closure means.

13. The combination of claim 1, further defined by said transport valve assembly being of hollow, generally cylindrical configuration, connected at one axial end to said transport and defining at the opposite axial end an opening having an internal rearwardly facing annular valve seat for cooperating with said valve closure means;
said transport valve closure means including a closure member of substantially disc shape having a forward radially outer portion sealingly engaging said annular valve seat and having a rearwardly extending cylindrical valve stem;
a plurality of internal circumferentially spaced radially extending truss assemblies secured to an inner cylindrical wall of said transport assembly housing and depending radially inwardly thereform to and for securing a hollow cylindrical valve guide, said valve guide axially slidably receiving said valve stem of said closure member for movement of said closure member between a forward, closed position in seated engagement with said annular valve seat and a rearwardly displaced open position internally of said housing.

14. The combination as set forth in claim 13, further comprising:
a bullet-shaped hollow shroud mounted internally of said transport valve assembly housing and having a rearwardly facing closed pointed end and a forwardly facing open end positioned in substantial longitudinal alignment with said valve stem of said transport valve closure means, said open end of said shroud disposed in rearward registration of said closure member to define a mating annular rear limit cooperating with a rearwardly facing radially outer portion of said disc-shaped valve closure member when the latter has been displaced rearwardly to its open position, whereby said shroud serves to minimize structural impedance to the flow of liquid through said transport valve assembly.

15. The combination set forth in claim 13, further comprising fairings surrounding said truss assemblies to further minimize impedance to the flow of fluid through said transport valve assembly.

16. The combination set forth in claim 13, further defined by said disc-shaped valve closure member being contoured in the form of an axial end section of a hollow, toroidal-shaped body, and said closure member being joined at the center thereof to said valve stem which is axially aligned therewith; and with the outcurve body section portions of said member facing forwardly of said valve assembly, whereby said closure member functions as a thin wall pressure vessel translating liquid pressure forces on the rearward face of the member into tangential tension forces resisted at the outer and inner edges of said member.

17. The combination set forth in claim 1, wherein said boom defines a longitudinal axis and said boom valve assembly includes a hollow cylindrical housing connected at one axial end to said boom in axial alignment therewith and open at the opposed axial end to define said boom end; said open end of said housing at said boom end defining an annular valve seat; said boom valve closure means having an axis of symmetry and being mounted for coaxial movement relative to said housing by said motive means between said closed retracted position in which it is seated against said valve seat of said housing and said open position in which it is spaced forwardly and apart from said positionable boom end; and said motive means including a motor-driven screw actuator and cooperating threaded follower connected to and axially aligned with said boom valve closure means, whereby said boom valve closure means and said unlocked transport valve closure means are forcibly impelled to their respective open positions in unison by said motor-driven screw actuator and follower.

18. The combination set forth in claim 17, wherein said motor-driven screw actuator is axially mounted within said boom housing by radially extending, circumferentially spaced apart struts whereby the liquid flows longitudinally of said assembly housing around said struts, actuator and follower.

19. The combination set forth in claim 18, further defined by said boom valve closure means being connected to said threaded follower by a ball and socket swivel joint to afford limited universal movement of said boom valve closure means during engagement thereof with said transport valve closure means.

20. The combination of claim 17, wherein said boom valve closure means comprises a conical shaped member defining said axis of symmetry and mounted with the convex face pointed rearwardly of said boom housing and being connected thereat to said threaded follower, and with rearwardly facing radially outer peripheral portions of said convex face seating against said boom housing annular valve seat when said closure member is in its closed position.

21. The combination set forth in claim 1, wherein said plunger means includes an elongate plunger member mounted in said transport valve assembly for slidable movement between said unactuated and actuated positions along an axis longitudinally aligned with said boom when in said mating engagement with said transport valve assembly, said plunger member having an end protruding from a forward portion of said transport assembly for engagement by said boom actuator means, said member end having detent means provided thereon;
said actuator means being carried by said movable boom valve closure means and including abutment means for engaging said protruding end of and rearwardly displacing said plunger member upon said movement of said boom into said mating engagement with said transport valve assembly, and said actuator means further including cam-operated, articulated retraction finger means selectively cooperating with said plunger member detent means during said mating engagement of said boom and transport valve assemblies for grasping and retracting said plunger member toward its unactuated position during movement of said boom valve closure means from said open position spaced apart from said boom end back to its normally closed position.

22. The combination set forth in claim 21, wherein said retraction finger means comprises a plurality of generally elongate retraction finger members pivotally mounted at one end to said boom closure means and having catch portions adjacent the opposite ends for articulation thereof between a radially, outward out-of-the-way position spaced from said plunger member and a radially inward, operative position for engaging said detent means on said end of said plunger member;
camming means rotatably connected to said boom closure means for contacting said transport valve closure means upon movement of said boom and transport valve assemblies into said mating engagement to rotatably displace said camming means from an unactuated condition to an actuated condition; said articulated retraction finger members each having a follower portion cooperating with said camming means for articulating said catch portions between said out-of-the-way position and said radially inward, operative position in response to rotation of said camming means between said unactuated condition and said rotatably displaced actuated condition upon engagement of said boom and transport valve assemblies; and
biasing spring means associated with said articulated finger member means and said camming means for continuously urging said finger members and catch portions thereon toward said radially outward, out-of-the-way position.

23. Th combination set forth in claim 1, wherein said positionable boom end is cylindrical in shape and further comprising:
an annular alignment receptacle carried by said transport valve assembly at a forward boom receiving position thereon and circumjacent said transport closure means for coaxially receiving said positionable end of said boom therewithin; and
inflatable sealing means circumferentially disposed about an outer circumference of said boom adjacent said positionable end thereof for assuming a position coaxially nested within said annular alignment receptacle to provide a selective annular seal between said boom and transport valve assembly during said mating engagement.

24. The combination set forth in claim 23, wherein said inflatable sealing means comprises a substantially tubular flexible, inflatable member circumferentially carried about said outer circumference of said boom adjacent said positionable end, said inflatable member having a deflated, collapsed condition in which it is radially, inwardly collapsed away from said transport valve alignment receptacle and having an inflated condition in which said inflatable member is expanded in sealing, radial compression between an inner circumferential wall of said transport receptacle and said outer circumference of said boom adjacent said positionable end.

25. A valve apparatus comprising:
a valve housing defining a valve seat;
movable valve closure means mounted in said valve housing for movement with respect to said valve seat between an open valve position and a closed valve position;
an elongagte tension link having first and second ends, the first end of said tension link connected to said valve housing;
first and second toggle links having adjacent ends pivotally connected together at a toggle joint and having remote ends, one of said remote ends being pivotally connected to the second end of said tension link and the other of said remote ends being pivotally connected to said valve closure means so that said toggle links are articulatable between a locked condition and an unlocked condition, said toggle links when in said locked condition assuming a stable overcenter substantially aligned disposition and extending generally parallel to said tension link so as to act in compression between the second end of said tension link and said valve closure means to exert a locking force that holds said valve closure means in said closed valve position, and said toggle links when in said unlocked condition assuming a non-aligned collapsed disposition in which said locking force on said valve closure means is released permitting said valve closure means to move to said open valve position, said tension link and said toggle links being constructed and arranged such that when said toggle links are in said locked condition thermal expansion and contraction of said toggle links is compensated for by substantially equal thermal expansion and contraction, respectively, of said tension link so that said locking force on said valve closure means remains substantially constant; and lock-unlock means connected to said toggle links for moving said toggle links between said locked condition and said unlocked condition.

* * * * *